United States Patent
Okita et al.

(10) Patent No.: US 10,882,386 B2
(45) Date of Patent: Jan. 5, 2021

(54) POWERTRAIN MOUNT STRUCTURE OF VEHICLE

(71) Applicant: MAZDA MOTOR CORPORATION, Hiroshima (JP)

(72) Inventors: Koji Okita, Hiroshima (JP); Hiroaki Suumen, Higashihiroshima (JP); Satoshi Mizutani, Hatsukaichi (JP); Masaki Aoyama, Hiroshima (JP); Hiromi Miwade, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 259 days.

(21) Appl. No.: 15/969,143

(22) Filed: May 2, 2018

(65) Prior Publication Data
US 2019/0031010 A1 Jan. 31, 2019

(30) Foreign Application Priority Data

Jul. 26, 2017 (JP) .................. 2017-144092

(51) Int. Cl.
*B60K 5/12* (2006.01)
*B60K 5/04* (2006.01)

(52) U.S. Cl.
CPC .......... *B60K 5/1225* (2013.01); *B60K 5/1208* (2013.01); *B60K 5/1216* (2013.01); *B60K 5/04* (2013.01); *B60Y 2306/01* (2013.01)

(58) Field of Classification Search
CPC ...... B60K 5/04; B60K 5/1208; B60K 5/1216; B60K 5/1225
See application file for complete search history.

(56) References Cited

U.S. PATENT DOCUMENTS

| | | | |
|---|---|---|---|
| 4,703,828 A * | 11/1987 | Mertens ..................... | F16F 1/54 180/291 |
| 10,208,847 B1 * | 2/2019 | Lee ......................... | F16F 1/3713 |
| 2004/0045761 A1 * | 3/2004 | Miyahara ................. | B60K 5/04 180/292 |
| 2005/0121250 A1 * | 6/2005 | Miyahara ............. | B60K 5/1208 180/291 |
| 2006/0144631 A1 * | 7/2006 | Kim ...................... | B60K 5/1216 180/299 |
| 2011/0056761 A1 * | 3/2011 | Weissbecker ........ | B60K 5/1208 180/382 |
| 2012/0090912 A1 * | 4/2012 | Gannon ............... | B60K 5/1216 180/312 |

(Continued)

FOREIGN PATENT DOCUMENTS

JP 2017-065562 A 4/2017

*Primary Examiner* — Barry Gooden, Jr.
(74) *Attorney, Agent, or Firm* — Studebaker & Brackett PC

(57) ABSTRACT

A transmission-side mount bracket includes connection portions which connect a front-side leg portion and a rear-side leg portion of a leg member, a middle attachment (fixation) portion which is provided at the connection portions at a position located between the front-side leg portion and the rear-side leg portion and fixed to the powertrain, and a rigidity-reduction portion (an opening portion) which has the rigidity against a load applied in the vehicle width direction which is lower than that of the front-side leg portion and the rear-side leg portion and is provided at a position located in the vicinity of the middle attachment (fixation) portion.

4 Claims, 22 Drawing Sheets

(56) References Cited

U.S. PATENT DOCUMENTS

| | | | |
|---|---|---|---|
| 2012/0267184 A1* | 10/2012 | Joly | F16F 1/373 |
| | | | 180/291 |
| 2013/0161111 A1* | 6/2013 | Kim | B60K 5/04 |
| | | | 180/292 |
| 2015/0053496 A1* | 2/2015 | Jomaa | G06F 30/00 |
| | | | 180/292 |
| 2015/0129742 A1* | 5/2015 | Okanaka | B60K 5/1208 |
| | | | 248/634 |
| 2016/0059685 A1* | 3/2016 | Bujak | B60K 5/1208 |
| | | | 248/636 |
| 2016/0347374 A1* | 12/2016 | Miyamoto | B62D 21/152 |
| 2017/0036526 A1* | 2/2017 | Horseman | B60K 5/1208 |
| 2017/0113534 A1* | 4/2017 | Mathai | F16F 13/107 |
| 2017/0267090 A1* | 9/2017 | Kim | B60K 5/1208 |
| 2018/0257471 A1* | 9/2018 | Soma | F16F 1/373 |
| 2019/0031011 A1* | 1/2019 | Fujiaki | B60K 5/1283 |
| 2019/0070945 A1* | 3/2019 | Kondo | B60K 5/1208 |
| 2019/0160931 A1* | 5/2019 | Kim | B60K 5/1208 |
| 2019/0184804 A1* | 6/2019 | Shynn | B62D 21/152 |
| 2019/0329640 A1* | 10/2019 | Kadowaki | F16F 1/36 |
| 2019/0344650 A1* | 11/2019 | Suumen | B60K 1/00 |

\* cited by examiner

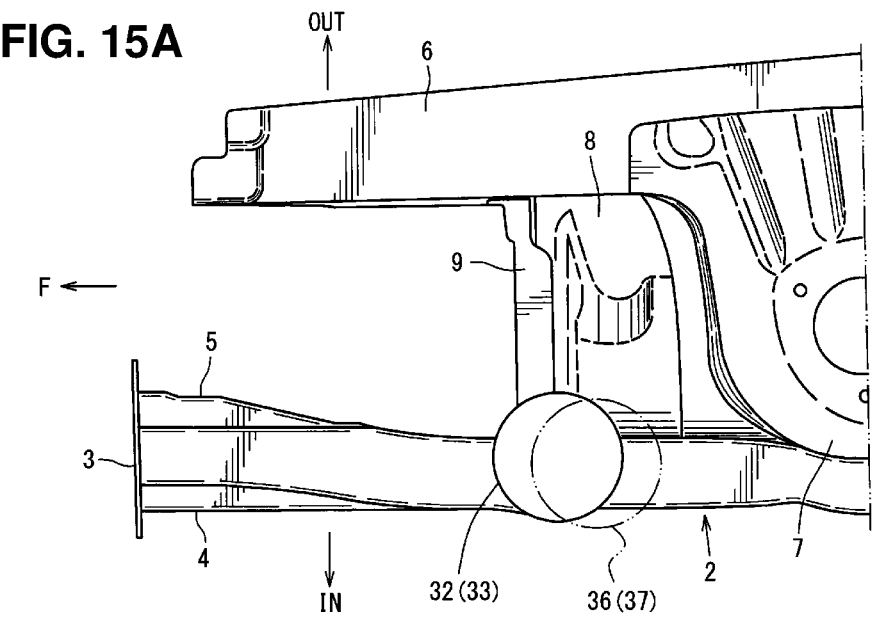
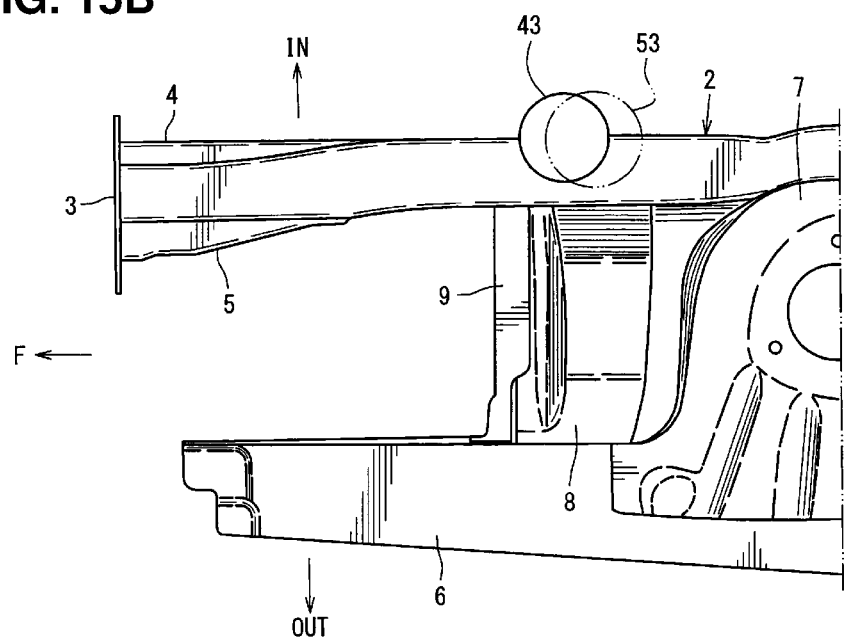

POWERTRAIN MOUNT STRUCTURE OF VEHICLE

BACKGROUND OF THE INVENTION

The present invention relates to a powertrain mount structure of a vehicle, in which a powertrain-side mount bracket including a single extension portion which is provided to extend outward in a vehicle width direction from an upper end of a leg member comprising a front-side leg portion and a rear-side leg portion is connected to a vehicle-body-side mount bracket via a mount rubber attached to the extension portion.

In general, a powertrain comprising an engine and a transmission which are connected is supported at front side frames via mount support portions. Conventionally, a structure shown in FIG. 22C is known as a transmission-side mount support portion. That is, as shown in the same figure, there is provided a powertrain-side mount bracket 100 which includes mount-rubber support pieces 101, 102 at its front side and its rear side, wherein respective base portions of these mount-rubber support pieces 101, 102 are connected by a connection portion 103 extending in a vehicle longitudinal direction, so that the powertrain-side mount bracket 100 is configured in a U shape in a plan view.

In the conventional powertrain-side mount bracket 100, plural different resonance frequencies f1, f2, f3 to a torsion occur at the front-and-rear two mount-rubber support pieces 101, 102 (see FIG. 22A). Herein, there is a problem that these resonance frequencies f1, f2, f3 overlap a gear-noise vibratory force band shown in the same figure, so that noises may be amplified.

Herein, the present inventors and others have found that an ideal characteristic can be obtained by setting a resonance frequency f0 of a bending mode at about 500 Hz in a low frequency range which does not influence both an engine-sound band and the gear-noise vibratory force band and also setting a resonance frequency f4 of a torsional mode at about 2000 Hz which is as far as possible from the above-described resonance frequency f0 of the bending mode on a high-frequency side as shown in FIG. 22B. In this figure, an area where a transfer ratio is less than "1", which is illustrated by hatching, shows a noise damping effect by means of the mount rubber.

Japanese Patent Laid-Open Publication No 2017-65562 discloses the powertrain mount structure of the vehicle in which the powertrain-side mount bracket including the single extension portion which is provided to extend outward in the vehicle width direction from the upper end of the leg member comprising the front-side leg portion and the rear-side leg portion is connected to the vehicle-body-side mount bracket via the mount rubber attached to the extension portion.

In a case where a mount-rubber support point is set at a single point of the extension portion like the structure disclosed in the above-described patent document, there is a merit that the number of the resonance frequency to the torsion of the powertrain-side mount bracket can be made single, but there is a problem that the rigidity of the mount bracket is low.

It can be considered in order to improve the above-described matter that a middle fixation portion is positioned between fixation portions of respective lower portions of the front-side and rear-side leg portions. In this case, however, the middle fixation portion may excessively strengthen not only the strength to the torsional rigidity strong but the strength to the bending rigidity. Consequently, there is a concern that the resonance point of the bending mode may become higher than the ideal resonance frequency f0 (see FIG. 22B) and overlap the gear-noise vibratory force band, so that the noises may be amplified improperly.

SUMMARY OF THE INVENTION

Accordingly, an object of the present invention is to provide a powertrain mount structure of a vehicle which can suppress an increase of the bending rigidity, improving the rigidity against the torsion of the powertrain-side mount bracket (i.e., the roll rigidity and the like), thereby setting a torsional resonance point at in a high frequency range and also setting a bending resonance point in a low frequency range.

A powertrain mount structure of a vehicle of the present invention comprises a powertrain-side mount bracket including a leg member and a single extension portion, the leg member comprising a front-side leg portion and a rear-side leg portion which are spaced apart from each other in a vehicle longitudinal direction and respectively fixed to a powertrain, the single extension portion being provided to extend outward in a vehicle width direction from an upper end of the leg member, a mount rubber attached to the extension portion of the powertrain-side mount bracket, and a vehicle-body-side mount bracket provided to be connected to the powertrain-side mount bracket via the mount rubber and fixed to a vehicle body, characterized in that the powertrain-side mount bracket includes a connection portion which connects the front-side leg portion and the rear-side leg portion, a middle fixation portion which is provided at the connection portion at a position located between the front-side leg portion and the rear-side leg portion and fixed to the powertrain, and a rigidity-reduction portion which has a rigidity against a load applied in the vehicle width direction which is lower than that of the front-side leg portion and the rear-side leg portion and is provided at a position located in the vicinity of the middle fixation portion.

According to the present invention, the rigidity against the torsion of the powertrain-side mount bracket (the roll rigidity and the like) can be improved by the connection portion and the middle fixation portion. Further, the increase of the bending rigidity can be suppressed by forming the rigidity reduction portion. Consequently, the torsional resonance point can be set in the high frequency range and also the bending resonance point can be set in the low frequency range.

Herein, in a case where the rigidity of the powertrain-side mount bracket is reduced by the rigidity reduction portion, if the rigidity of the vertical direction and the longitudinal direction is reduced, not only the roll rigidity but the rigidity against a load input from a road surface in the vertical direction decrease, so that the rigidity of the vehicle width direction where a large load is not inputted can be reduced.

In an embodiment of the present invention, the rigidity-reduction portion of the powertrain-side mount bracket is an opening portion which is formed at a position located above the connection portion and between the front-side leg portion and the rear-side leg portion.

According to this embodiment, reduction of the rigidity of the vehicle width direction of the powertrain-side mount bracket can be achieved by forming the above-described opening portion.

In another embodiment of the present invention, the rigidity-reduction portion of the powertrain-side mount bracket is a thin vertical wall portion which is formed at a position located above the connection portion and between the front-side leg portion and the rear-side leg portion, the thin wall portion having a narrower width than the front-side leg portion and the rear-side leg portion.

According to this embodiment, the reduction of the rigidity of the vehicle width direction of the powertrain-side mount bracket can be achieved by forming the above-described thin vertical wall portion.

In another embodiment of the present invention, the powertrain-side mount bracket includes a vertical wall portion which is formed between the front-side leg portion and the rear-side leg portion, and the rigidity-reduction portion of the powertrain-side mount bracket is a lightening hole portion which is formed inside the vertical wall portion.

According to this embodiment, the reduction of the rigidity of the vehicle width direction of the powertrain-side mount bracket and also weight reduction can be achieved by forming the above-described lightening hole portion.

In another embodiment of the present invention, the powertrain-side mount bracket includes a rib which is provided at the vertical wall portion in an area where the lightening hole portion is formed such that the rib is bridged inside the lightening hole portion.

According to this embodiment, excessive reduction of the rigidity of the vehicle width direction can be suppressed by the above-described rib.

In another embodiment of the present invention, the rigidity-reduction portion of the powertrain-side mount bracket is formed by positioning the middle fixation portion inward, in the vehicle width direction, relative to a fixation position of the front-side leg portion and the rear-side leg portion fixed to the powertrain.

According to this embodiment, the reduction of the rigidity of the vehicle width direction of the powertrain-side mount bracket can be achieved by positioning the middle fixation portion inward, in the vehicle width direction, relative to the fixation position of the front-side leg portion and the rear-side leg portion fixed to the powertrain.

In another embodiment of the present invention, the connection portion of the powertrain-side mount bracket is configured to linearly connect the front-side leg portion and the rear-side leg portion, and the rigidity-reduction portion of the powertrain-side mount bracket is formed by the middle fixation portion which is positioned inward, in the vehicle width direction, relative to the linear connection portion.

According to this embodiment, the reduction of the rigidity of the vehicle width direction of the powertrain-side mount bracket can be achieved by forming the middle fixation portion which is positioned inward, in the vehicle width direction, relative to the linear connection portion.

In another embodiment of the present invention, the connection portion is formed by a front-side part which extends inward, in the vehicle width direction, from the front-side leg portion toward the middle fixation portion and a rear-side part which extends inward, in the vehicle width direction, from the rear-side leg portion toward the middle fixation portion, and the rigidity-reduction portion of the powertrain-side mount bracket is formed by the middle fixation portion which is positioned at a point where the front-side part of the connection portion and the rear-side part of the connection portion are continuous to each other.

According to this embodiment, the reduction of the rigidity of the vehicle width direction of the powertrain-side mount bracket can be achieved by forming the middle fixation portion which is positioned at the point where the front-side part of the connection portion and the rear-side part of the connection portion are continuous to each other.

Other features, aspects, and advantages of the present invention will become apparent from the following description which refers to the accompanying drawings.

BRIEF DESCRIPTION OF THE DRAWINGS

FIG. 15A is a plan view showing a changing state of a longitudinal position of a right-side mount rubber, and FIG. 15B is a plan view showing a changing state of a longitudinal position of a left-side mount rubber.

DETAILED DESCRIPTION OF THE INVENTION

Embodiment 1

Figure 1:
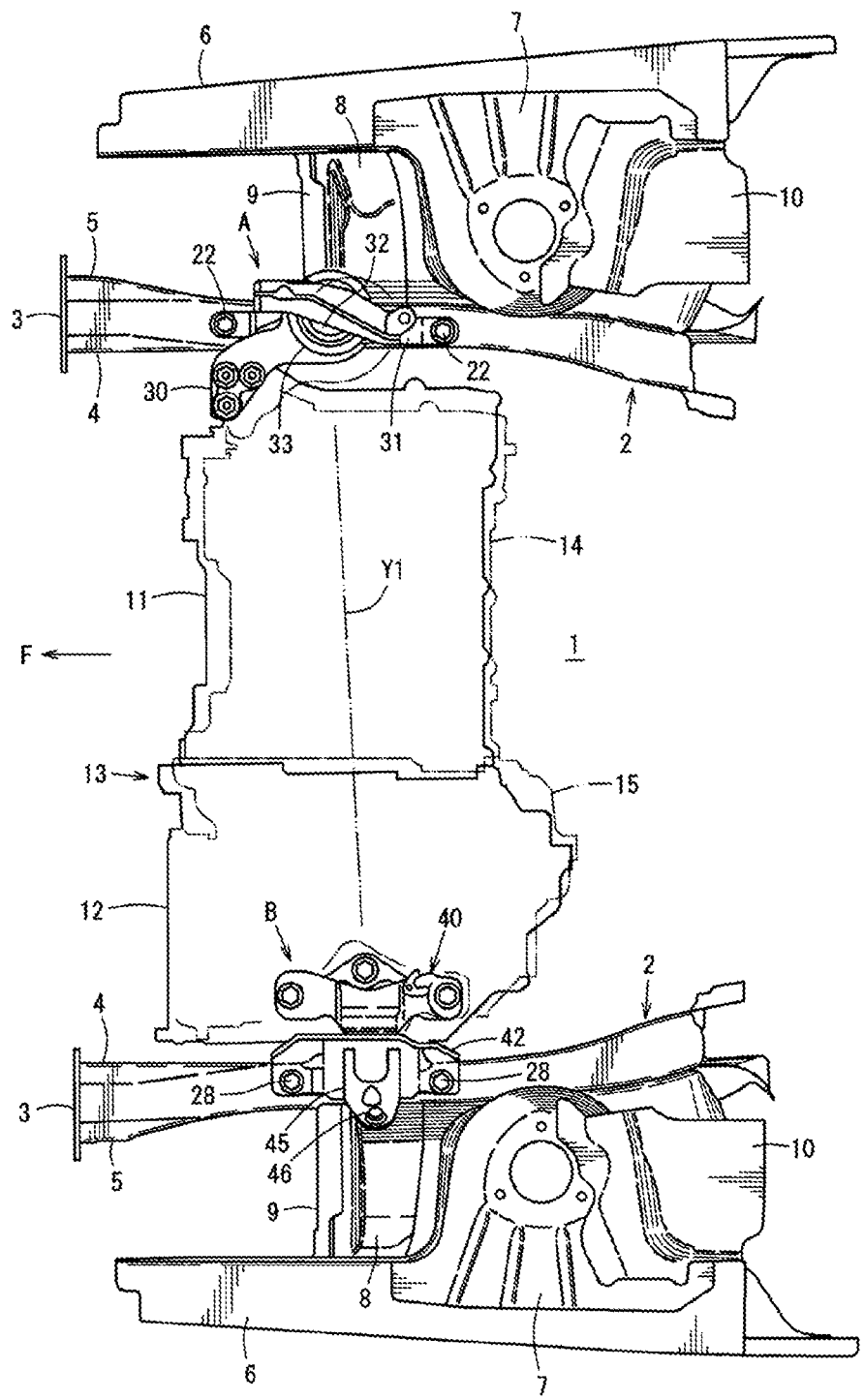
FIG. 1 is a plan view showing a powertrain mount structure of a vehicle of the present invention.
Figure 2:
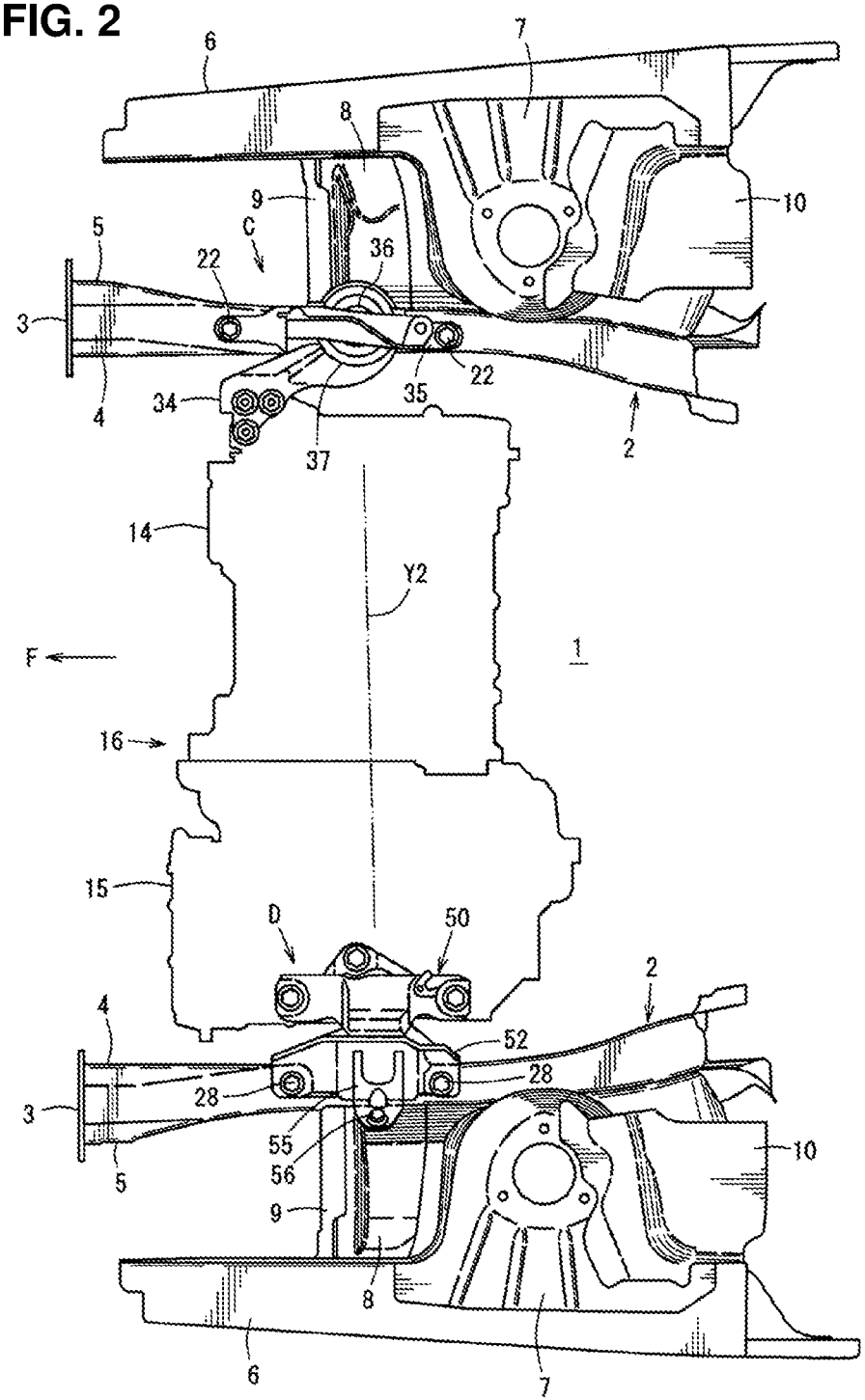
FIG. 2 is a plan view showing a state where a longitudinal position of a mount rubber is changed rearward.
Figure 3:
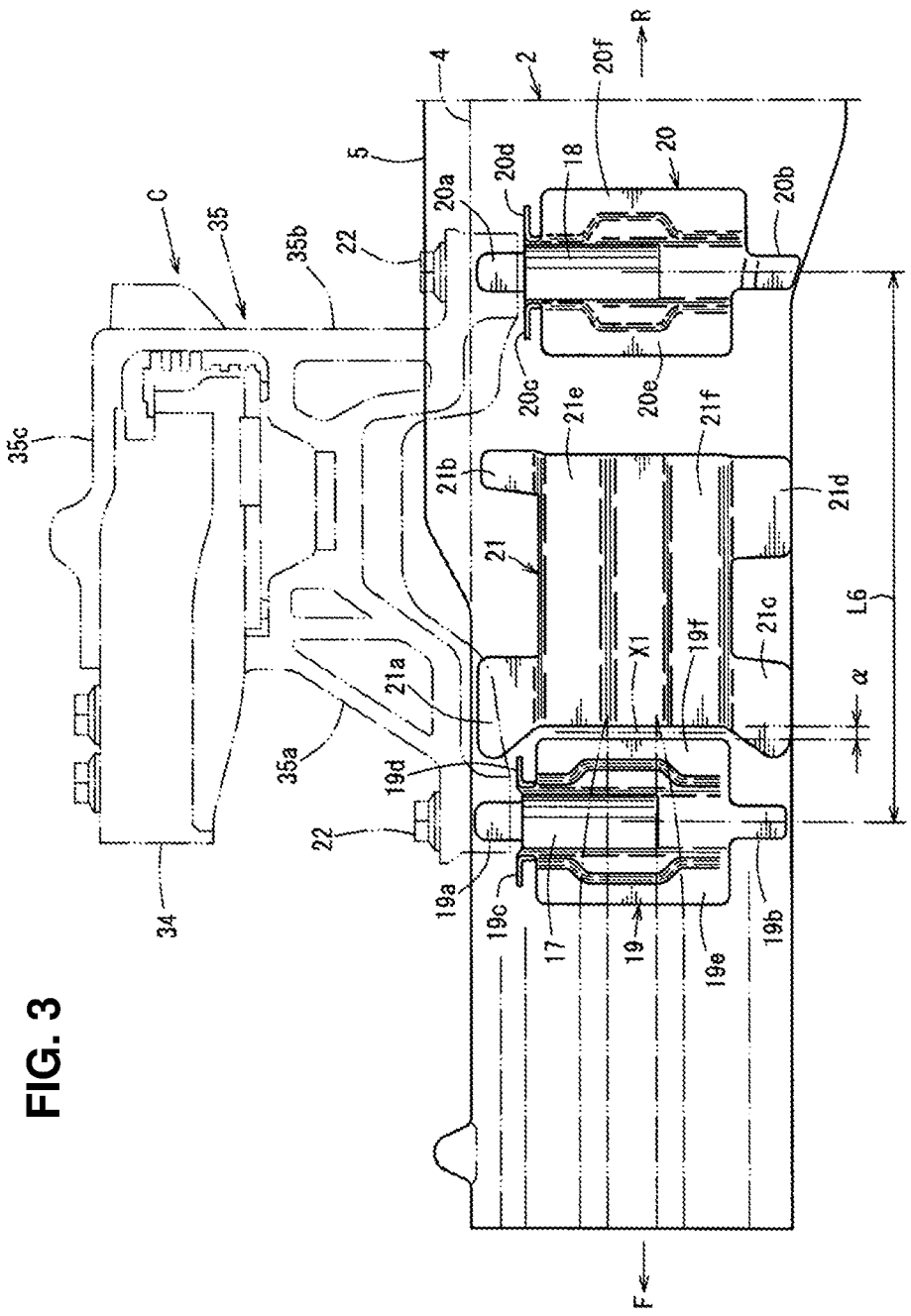
FIG. 3 is a side view showing an inside structure of a right-side front side frame.
Figure 4:
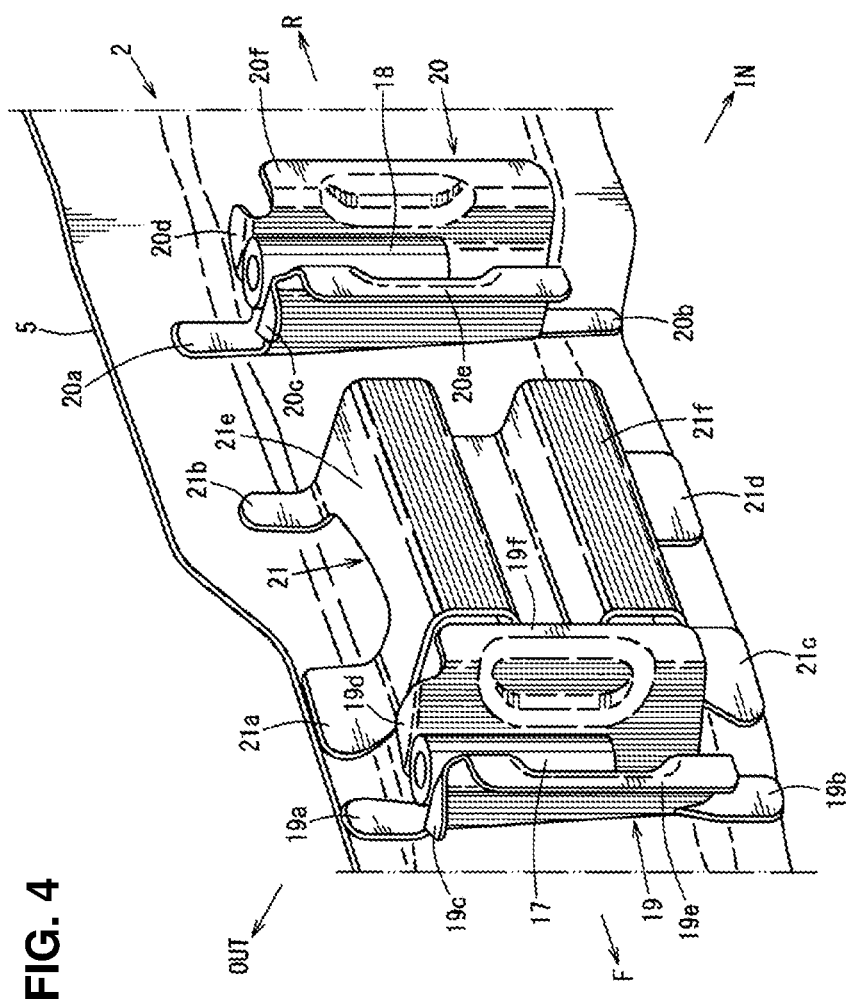
FIG. 4 is a perspective view of FIG. 3.
Figure 5:
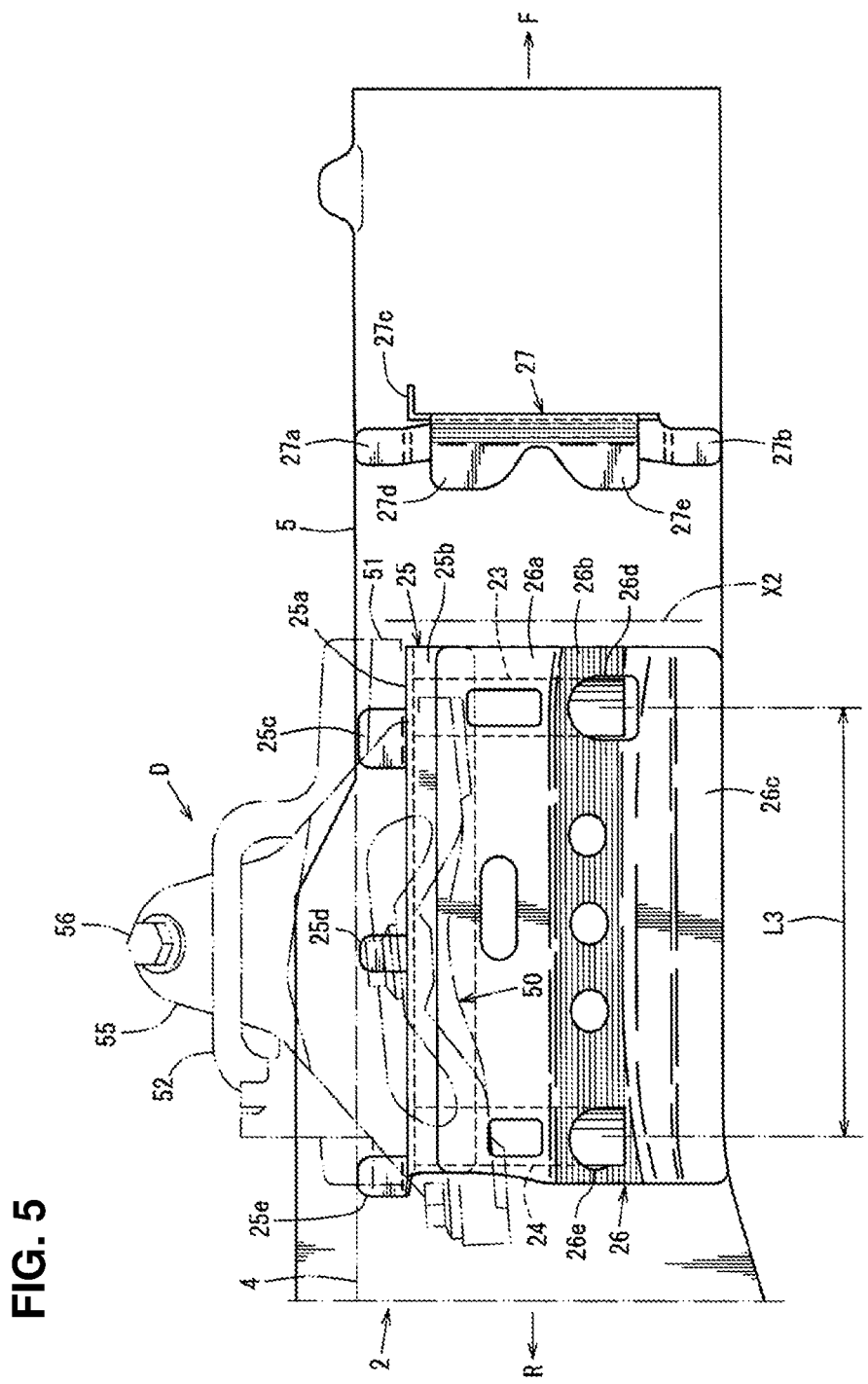
FIG. 5 is a side view showing an inside structure of a left-side front side frame.
Figure 6:
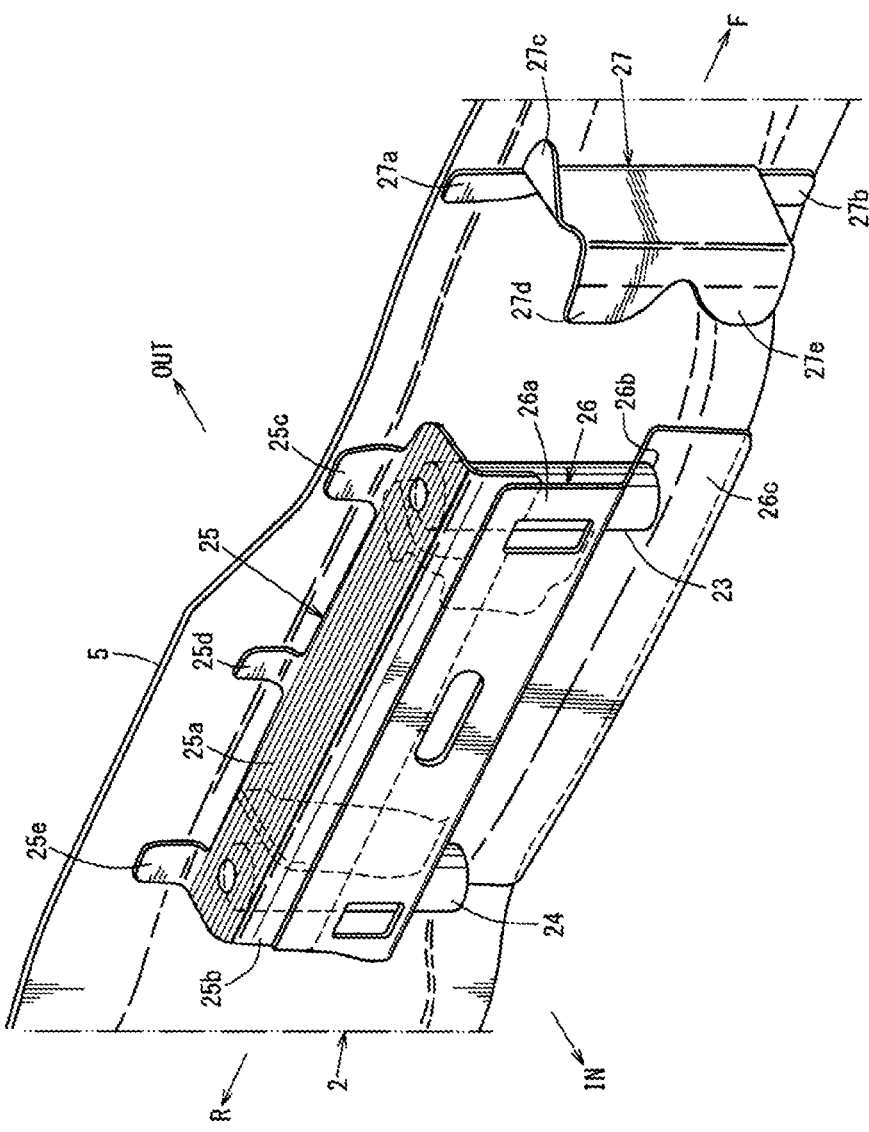
FIG. 6 is a perspective view of FIG. 5.

Hereafter, an embodiment of the present invention will be described referring to the drawings. The drawings show a powertrain mount structure of a vehicle, and FIG. 1 is a plan view showing the powertrain mount structure, FIG. 2 is a plan view showing a state where a longitudinal position of a mount rubber is rearward changed, FIG. 3 is a side view showing an inside structure of a right-side front side frame, FIG. 4 is a perspective view of FIG. 3, FIG. 5 is a side view showing an inside structure of a left-side front side frame, and FIG. 6 is a perspective view of FIG. 5.

[Body-Side Structure]

A body-side structure will be described first before describing the powertrain mount structure. As shown in FIGS. 1 and 2, a pair of right-and-left front side frames 2, 2 which extend in a vehicle longitudinal direction at right-and-left both sides of an engine room 1 are provided, and a set plate 3 for attaching a crash can is attached to each front end of the front side frames 2, 2. The above-described front side frame 2 is a vehicle-body strength member which comprises a front side frame inner 4 and a front side frame outer 5 which are fixedly joined together so as to have a closed cross section extending in the vehicle longitudinal direction.

An apron 6 which extends forward from a hinge pillar is provided on an outward-and-upward side of the above-described front side frame 2, a suspension tower portion 7 is provided between the apron 6 and the front side frame 2, a wheel apron 8 which connects the apron 6 and the front side frame 2 is attached to a portion located right in front of the suspension tower portion 7, and a connecting member 9 which connects the apron 6 and the front side frame 2 is provided in front of the wheel apron 8. Further, a cowl side member 10 is provided at a rear portion of the suspension tower portion 7.

The present embodiment exemplifies, as plural kinds of powertrain provided in the engine room 1, a powertrain 13 which comprises an engine 11 and a transmission 12 which are connected together and is laterally arranged as shown in FIG. 1 and a powertrain 16 which comprises an engine 14 and a transmission 15 which are connected together and is laterally arranged as shown in FIG. 2.

[Inside Structure of Right-Side Front Side Frame]

As shown in FIGS. 3 and 4, inside the right-side front side frame 2 are provided a pair of front-and-rear cylindrical-shaped nut members 17, 18 which are spaced apart from each other in the longitudinal direction, a retainer 19 which fixedly supports the front-side nut member 17, a retainer 20 which fixedly supports the rear-side nut member 18, and a gusset 21 which is a reinforcing member arranged between the front-and-rear retainers 19, 20.

The front-side retainer 19 comprises a flange 19*a* which is fixed by respective upper-side joint flange portions of the front side frame inner 4 and the front side frame outer 5 (specifically, three-sheet welding fixation), a flange 19*b* which is fixed by respective lower-side joint flange portions of the front side frame inner 4 and the front side frame outer 5 (specifically, three-sheet welding fixation), and plural flanges 19*c*, 19*d*, 19*e*, 19*f* which are fixed to an inner face of the front side frame inner 4, and fixes the nut member 17 extending in the vertical direction at a U-shaped portion, in the plan view, which is formed between the front-and-rear flanges 19*e*, 19*f*.

Similarly to the front-side retainer 19, the rear-side retainer 20 comprises a flange 20*a* which is fixed by respective upper-side joint flange portions of the front side frame inner 4 and the front side frame outer 5 (specifically, three-sheet welding fixation), a flange 20*b* which is fixed by respective lower-side joint flange portions of the front side frame inner 4 and the front side frame outer 5 (specifically, three-sheet welding fixation), and plural flanges 20*c*, 20*d*, 20*e*, 20*f* which are fixed to the inner face of the front side frame inner 4, and fixes the nut member 18 extending in the vertical direction at a U-shaped portion, in the plan view, which is formed between the front-and-rear flanges 20*e*, 20*f*.

The gusset 21 comprises a pair of front-and-rear flanges 21*a*, 21*b* which are fixed by the upper-side flange portions of the front side frame 2 (three-sheet welding fixation), a pair of front-and-rear flanges 21*c*, 21*d* which are fixed by the lower-side flange portions of the front side frame 2 (three-sheet welding fixation), and two extensive protrusion portions 21*e*, 21*f* which extend in the vehicle longitudinal direction and protrude inward in a vehicle width direction in a U shape, in an elevational view of the vehicle, between the upper-side flanges 21*a*, 21*b* and the lower-side flanges 21*c*, 21*d*. The above-described nut members 17, 18 are the members into which bolts 22, 22 for vehicle-body-side mount bracket fastening (see FIG. 3) are screwed at engine-side mount support portions A, C, which will be described later.

[Inside Structure of Left-Side Front Side Frame]

As shown in FIGS. 5 and 6, inside the left-side front side frame 2 are provided a pair of front-and-rear cylindrical nut members 23, 24 which are spaced apart from each other in the longitudinal direction, gussets 25, 26 which are configured to be split into two pieces in the vertical direction as a reinforcing member to support the nut members 23, 24 and also reinforce the front side frame 2, and a brace member 27 which is arranged in front of the gussets 25, 26.

The upper-side gusset 25 comprises an upper piece 25*a* which extends in the longitudinal direction, a lower piece 25*b* which extends downward from an inward end, in the vehicle width direction, of the upper piece 25*a*, and plural flanges 25*c*, 25*d*, 25*e* which are fixed by the respective upper-side joint flange portions of the front side frame inner 4 and the front side frame outer 5 (three-sheet welding fixation).

The lower-side gusset 26 comprises an upper piece 26*a* which extends in the longitudinal direction and fixed to the lower piece 25*b* of the upper-side gusset 25, a slant piece 26*b* which extends outward and downward from a lower end of the upper piece 26*a*, a lower piece 26*c* which extends downward from a lower end of the slant piece 26*b* and fixed by the respective lower-side joint flange portions of the front side frame inner 4 and the front side frame outer 5 (three-sheet welding fixation), and nut-member holding holes 26*d*, 26*e* (see FIG. 5) which are formed at the slant piece 26*b* at locations which correspond to the nut members 23, 24, and this lower-side gusset 26 holds the nut members 23, 24 extending in the vertical direction at hole edges of the nut-member holding holes 26*d*, 26*e*.

The brace member 27 comprises a flange 27*a* which is fixed by the upper-side flange portions of the front side frame 2 (three-sheet welding fixation), a flange 27*b* which is fixed by the lower-side flange portions of the front side frame 2 (three-sheet welding fixation), and plural flanges 27*c*, 27*d*, 27*e* which are fixed to the inner face of the front side frame inner 4. The above-described nut members 23, 24 are the members into which bolts 28, 28 for vehicle-body-side mount bracket fastening (see FIGS. 1 and 2) are screwed at transmission-side mount support portions B, D, which will be described later.

[Powertrain Mount Structure]

Figure 7:
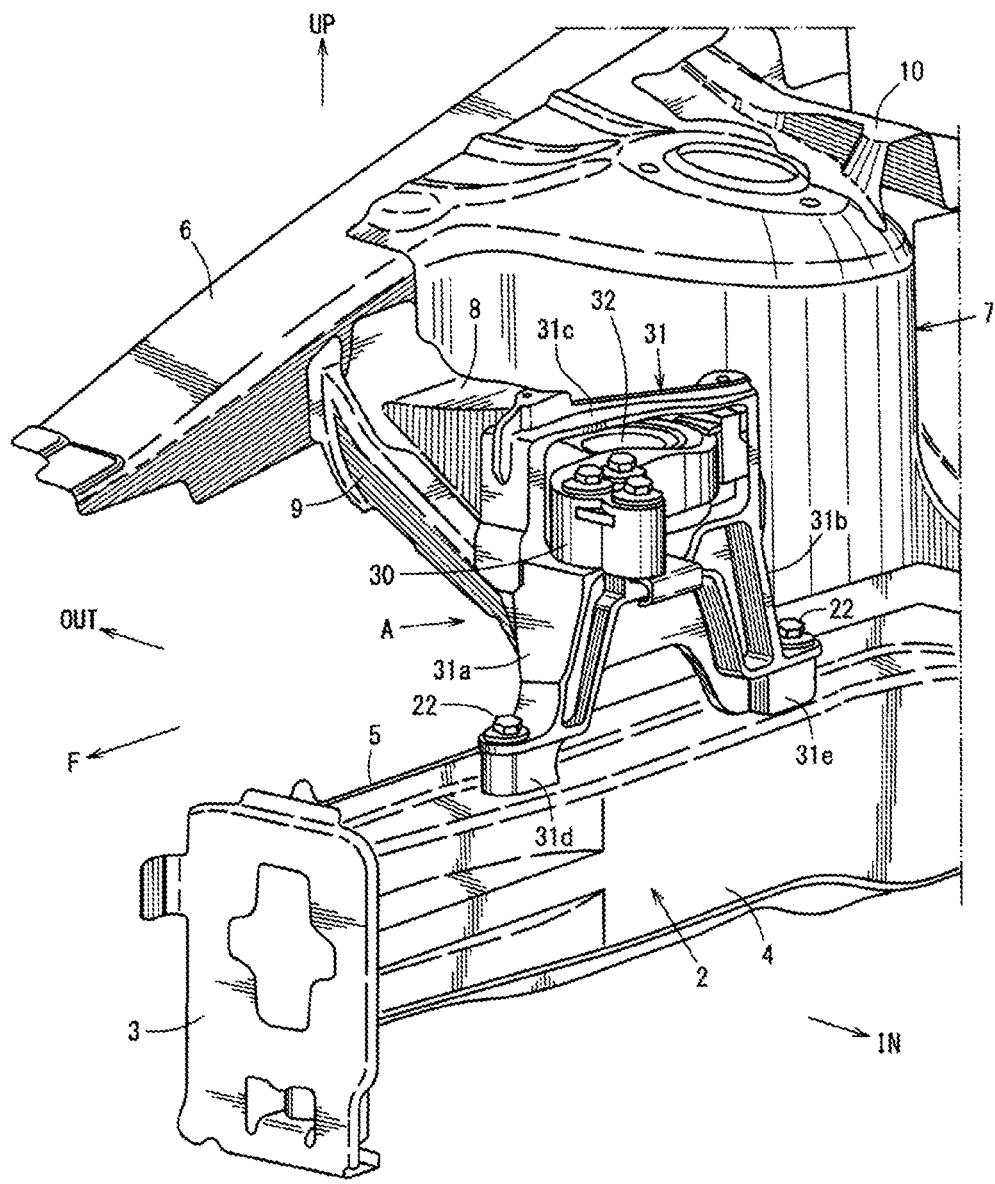
FIG. 7 is a perspective view showing a structure of a right-side powertrain mount of FIG. 1.
Figure 8:
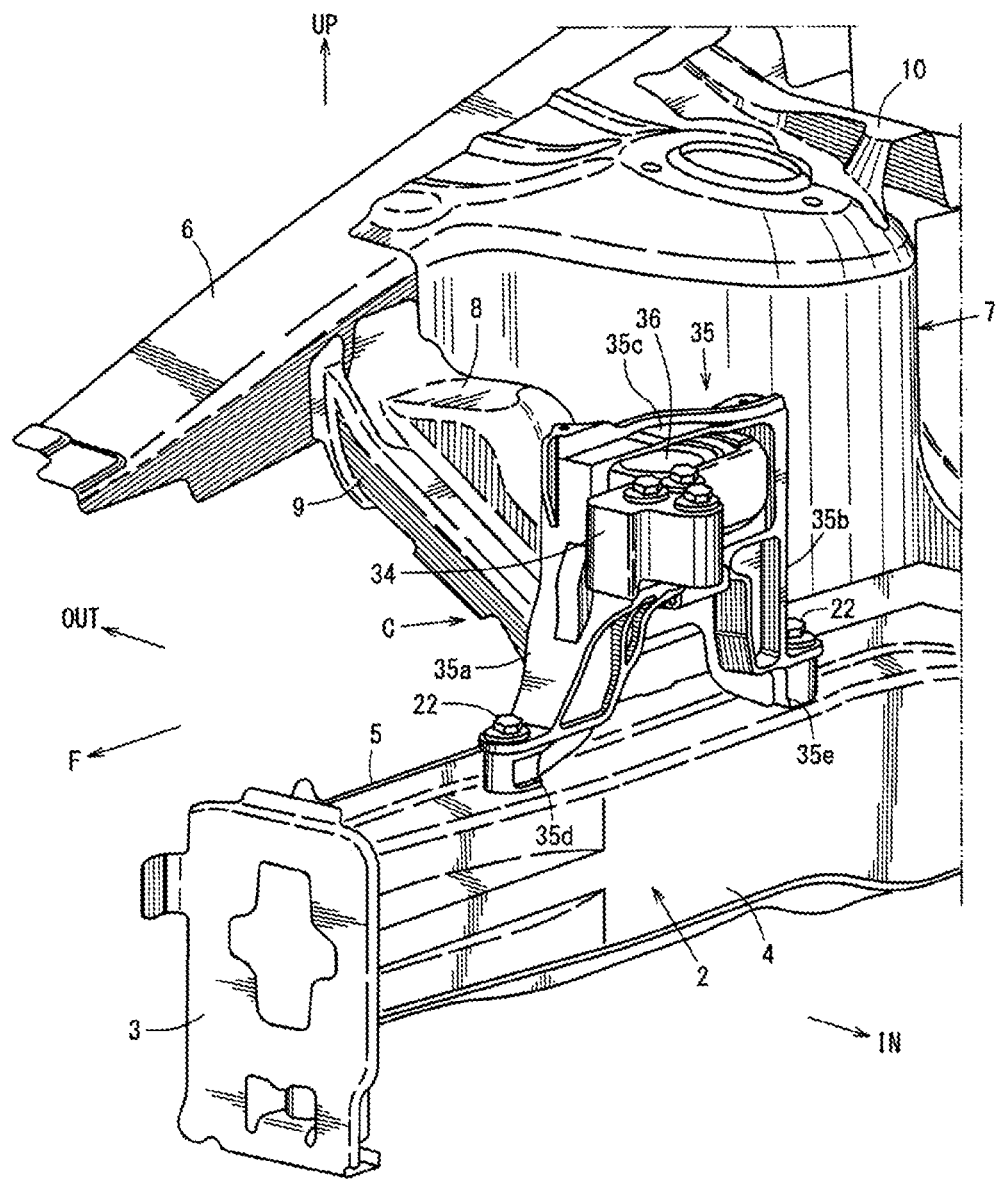
FIG. 8 is a perspective view showing a structure of a right-side powertrain mount of FIG. 2.
Figure 9A:
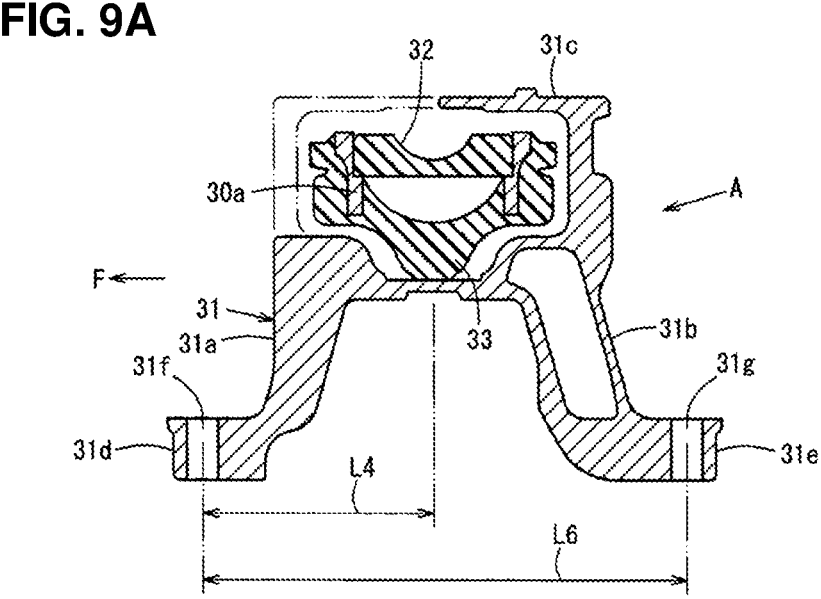
FIG. 9A is a major-part vertical sectional view of the structure of the powertrain mount of FIG. 7.
Figure 9B:
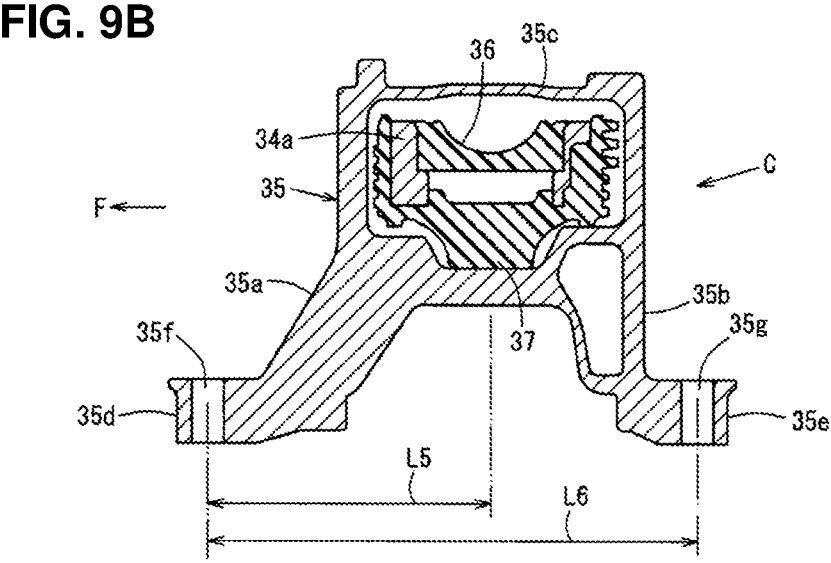
FIG. 9B is a major-part vertical sectional view of the structure of the powertrain mount of FIG. 8.

FIG. 7 is a perspective view showing a structure of a right-side powertrain mount of FIG. 1, FIG. 8 is a perspective view showing a structure of a right-side powertrain mount of FIG. 2, FIG. 9A is a major-part vertical sectional view of the structure of the powertrain mount of FIG. 7, and FIG. 9B is a major-part vertical sectional view of the structure of the powertrain mount of FIG. 8. The present embodiment is configured such that plural kinds of powertrain, i.e., the powertrain 13 and the powertrain 16 which have different longitudinal positions of gravity center, are selectively installed to the common vehicle body. In the present embodiment, the powertrain 13 and the powertrain 16 are configured such that the gravity center of the powertrain 13 is positioned in front of that of the powertrain 16 in the vehicle longitudinal direction.

That is, in a case where the powertrain 13 shown in FIG. 1 is installed, the powertrain 13 is supported at the front side frames 2, 2 by the engine-side mount support portion A and the transmission-side mount support portion B. In a case where the powertrain 16 shown in FIG. 2 is installed, the powertrain 16 is supported at the front side frames 2, 2 by the engine-side mount support portion C and the transmission-side mount support portion D.

[Structure of Engine-Side Mount Support Portion]

As shown in FIGS. 1, 7 and 9A, the engine-side mount support portion A for the powertrain 13 comprises an engine-side mount bracket 30, a vehicle-body-side mount bracket 31, and mount rubbers 32, 33.

The vehicle-body-side mount bracket 31 comprises, as shown in FIG. 9A, front-and-rear leg portions 31a, 31b, a frame-shaped portion 31c which is integrally formed at upper portions of the front-and-rear leg portions 31a, 31b, attaching seats 31d, 31e which extend in the longitudinal direction from lower ends of the front-and-rear leg portions 31a, 31b, and attaching holes 31f, 31g for the bolts 22 which are formed at the attaching seats 31d, 31e.

The engine-side mount bracket 30 includes an inner tube 30a which is positioned inside the frame-shaped portion 31c, a mount rubber 32 is provided at an inner periphery of an upper side of the inner tube 30a, and the above-described mount rubber 33 is provided at an outer peripheral portion and a lower portion of the inner tube 30a.

Herein, a longitudinal distance L6 between respective axial center portions of the front-and-rear attaching holes 31f, 31g is set to be the same as (equal to) a longitudinal center L6 between respective axial center portions of the nut members 17, 18 shown in FIGS. 3 and 4, and a distance between the axial center portion of the front-side attaching hole 31f and a center portion, in the longitudinal direction, of the mount rubbers 32, 33 is set as L4. Further, the longitudinal distance L6 between the front-and-rear attaching points of the vehicle-body-side mount bracket 31 is set to be longer than the longitudinal length of the mount rubber 33.

[Other Structures of Engine-Side Mount Support Portion]

As shown in FIGS. 2, 8 and 9B, the engine-side mount support portion C for the powertrain 16 comprises an engine-side mount bracket 34, a vehicle-body-side mount bracket 35, and mount rubbers 36, 37.

The vehicle-body-side mount bracket 35 comprises, as shown in FIG. 9B, front-and-rear leg portions 35a, 35b, a frame-shaped portion 35c which is interlay formed at upper portions of the front-and-rear leg portions 35a, 35b, attaching seats 35d, 35e which extend in the longitudinal direction from lower ends of the front-and-rear leg portions 35a, 35b, and attaching holes 35f, 35g for the bolts 22 which are formed at the attaching seats 35d, 35e.

The engine-side mount bracket 34 includes an inner tube 34a which is positioned inside the frame-shaped portion 35c, a mount rubber 36 is provided at an inner periphery of an upper side of the inner tube 34a, and the above-described mount rubber 37 is provided at an outer peripheral portion and a lower portion of the inner tube 34a.

Herein, a longitudinal distance L6 between respective axial center portions of the front-and-rear attaching holes 35f, 35g is set to be the same as (equal to) the longitudinal center L6 between the respective axial center portions of the nut members 17, 18 shown in FIGS. 3 and 4, and a distance between the axial center portion of the front-side attaching hole 35f and a center portion, in the longitudinal direction, of the mount rubbers 36, 37 is set as L5. Further, the longitudinal distance L5 shown in FIG. 9B is set to be longer than the longitudinal length L4 shown in FIG. 9A. That is, a relational expression L5>L4 is established.

[Longitudinal Position Change of Mount Rubber]

Further, the longitudinal distance L6 which is the distance of the front-and-rear attaching points is set to be longer than the longitudinal length of the mount rubber 37, and the longitudinal positions of the mount rubbers 32, 33, 36, 37 are configured to be changeable in a range between the longitudinal distance L6, i.e., at a position shown in FIG. 9A and a position shown in FIG. 9B. That is, the mount rubbers 32, 33, 36, 37 which are held by the vehicle-body-side mount brackets 31, 35 are configured such that the longitudinal length thereof is changeable by exchanging the vehicle-body-side mount brackets 31, 35 for each of the powertrains 13, 16.

The vehicle-body-side mount brackets 31, 35 shown in FIGS. 9A and 9B are respectively fixed to an upper face portion of the front side frame inner 4 by using a pair of front-and-rear bolts 22 and nuts 17, 18.

As shown in FIG. 3, each of the front side frames 2 is configured to break at a frame breaking point X1 in a vehicle frontal collision, and the frame breaking point X1 of the engine-side front side frame shown in the same figure is positioned between the nut members 17, 18 as the front-and-rear attaching points of the mount support portions A, C (the vehicle-body-side mount brackets 31, 35). The front side frame 2 is configured to absorb collision energy when it breaks having a break starting point at the frame breaking point X1 in the vehicle frontal collision.

Specifically, as shown in FIG. 3, the gusset 21 as the reinforcing member is provided within a range of the longitudinal distance L6 which is the distance between the front-and-rear attaching points of the vehicle-body-side mount brackets 31, 35 inside the front side frame 2. Within this rage of the longitudinal distance L6 of the engine-side front side frame 2 is provided a non-reinforcing-member arrangement portion a where no reinforcing member is arranged between a rear end of the retainer 19 and a front end of the gusset 21. Herein, this non-reinforcing-member arrangement portion a is set (positioned) at the above-described frame breaking point X1.

Figure 13:
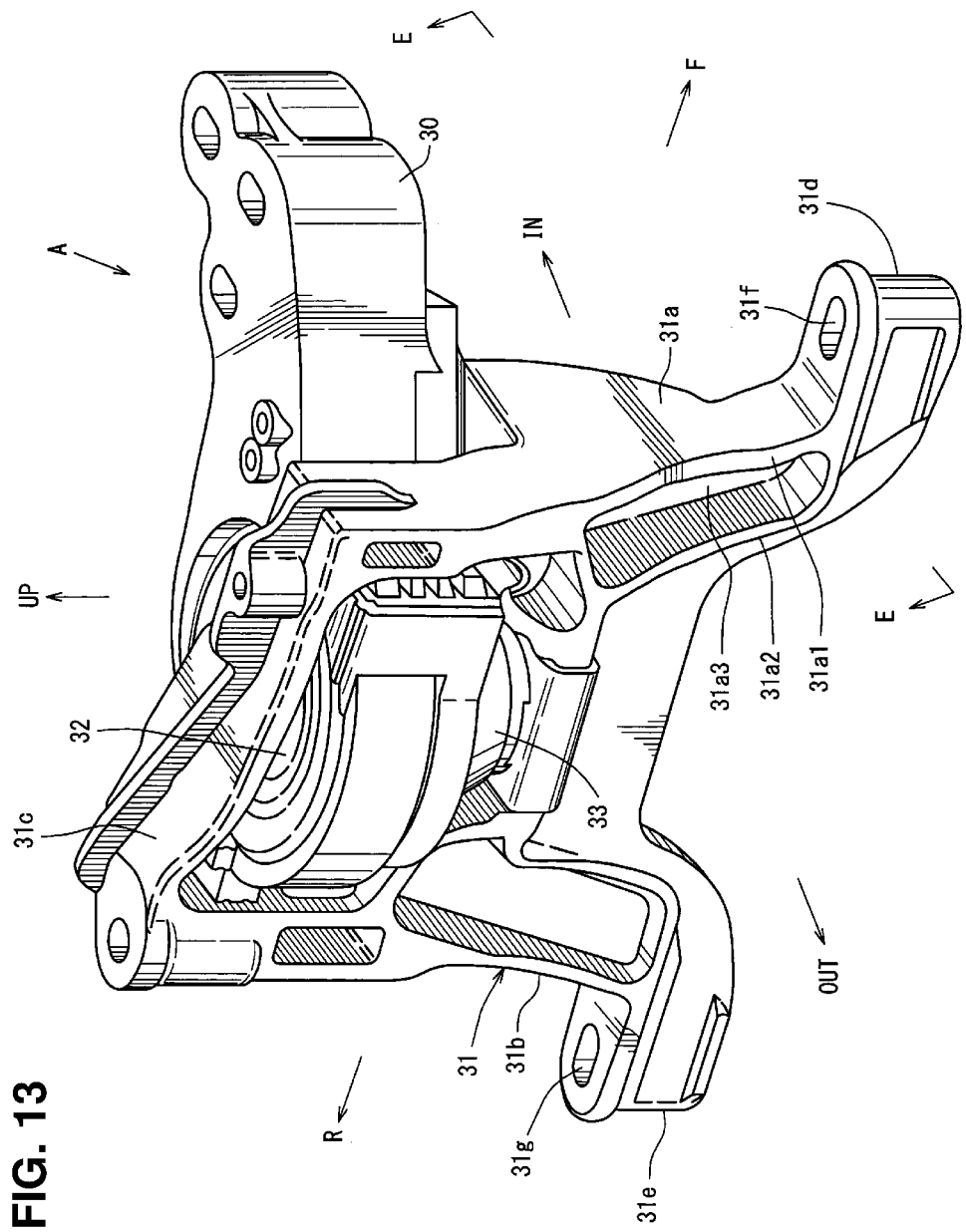
FIG. 13 is a perspective view showing a mount support portion shown in FIG. 7, when viewed from a forward-and-outward side of a vehicle.
Figure 14:
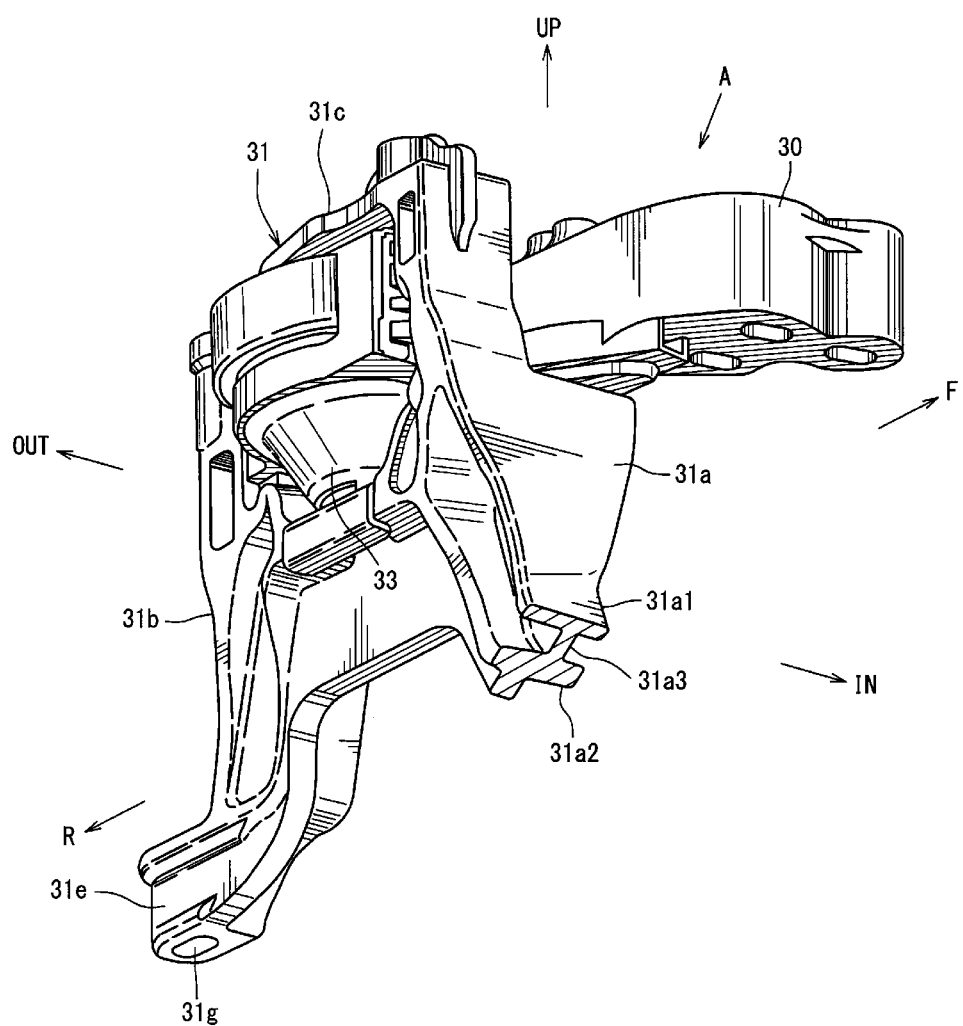
FIG. 14 is a sectional view taken along line E-E of FIG. 13.

FIG. 13 is a perspective view showing the mount support portion A shown in FIG. 7, when viewed from a forward-and-outward side of the vehicle, and FIG. 14 is a sectional view taken along line E-E of FIG. 13.

As shown in FIG. 14, the front-side leg portion 31a of the vehicle-body-side mount bracket 31 is configured such that wide portions 31a1, 31a2 where the width, in the vehicle width direction, thereof is wide are interconnected by a narrow portion 31a3 where the width, in the vehicle width direction, thereof is narrow, and this narrow portion 31a3 substantially corresponds to the position of the non-reinforcing-member arrangement portion a shown in FIG. 3 (i.e., the frame breaking point X1), so that the front side frame 2 is configured to be made to break at this point by a frame-breaking load which is generated in the vehicle frontal collision.

The vehicle-body-side mount brackets 31, 35 fixed to the engine-side front side frame 2 are made of a die-cast member, respectively. Specifically, these are made of an aluminum die-cast member.

[Structure of Transmission-Side Mount Support Portion]

Figure 10:
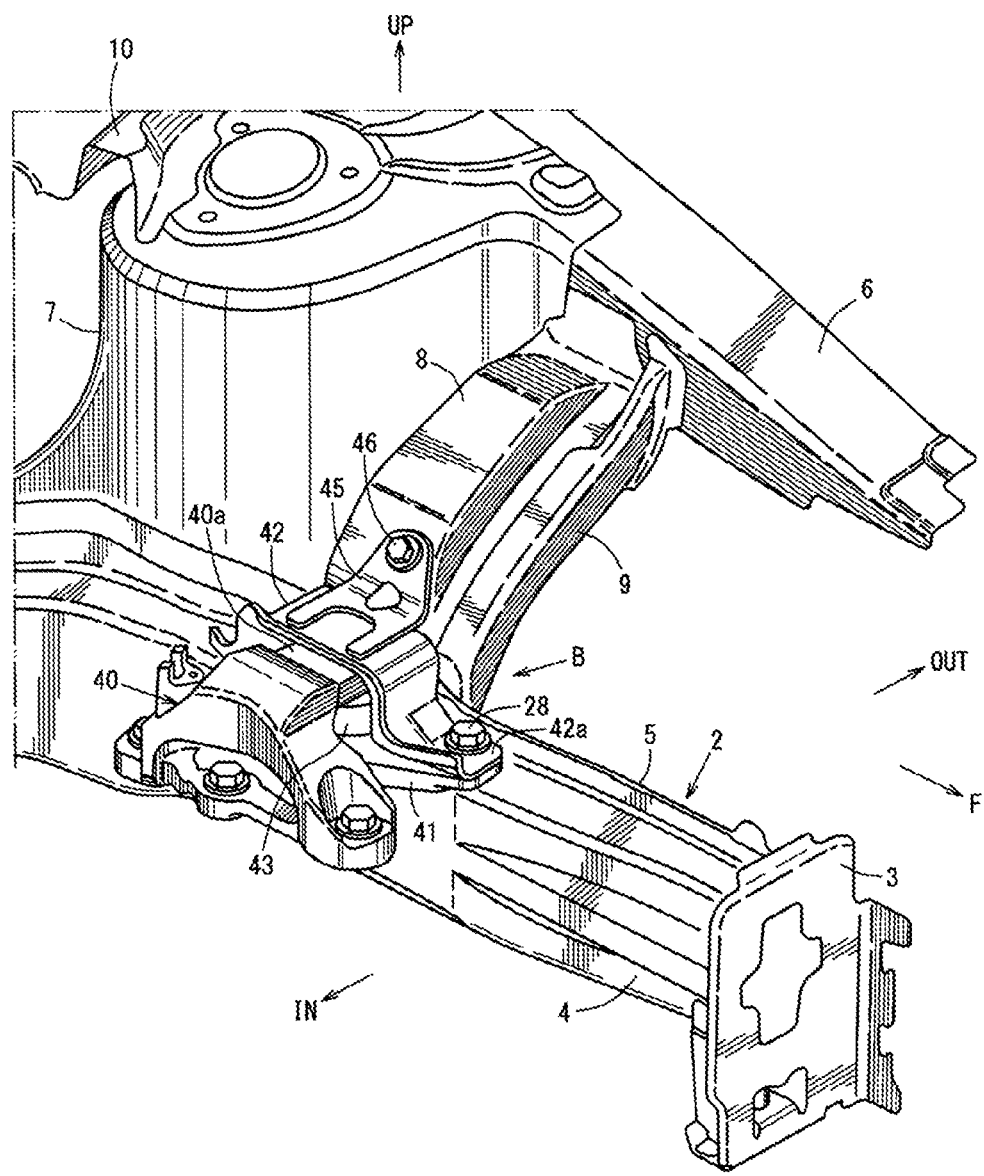
FIG. 10 is a perspective view showing a structure of a left-side powertrain mount of FIG. 1.
Figure 11:
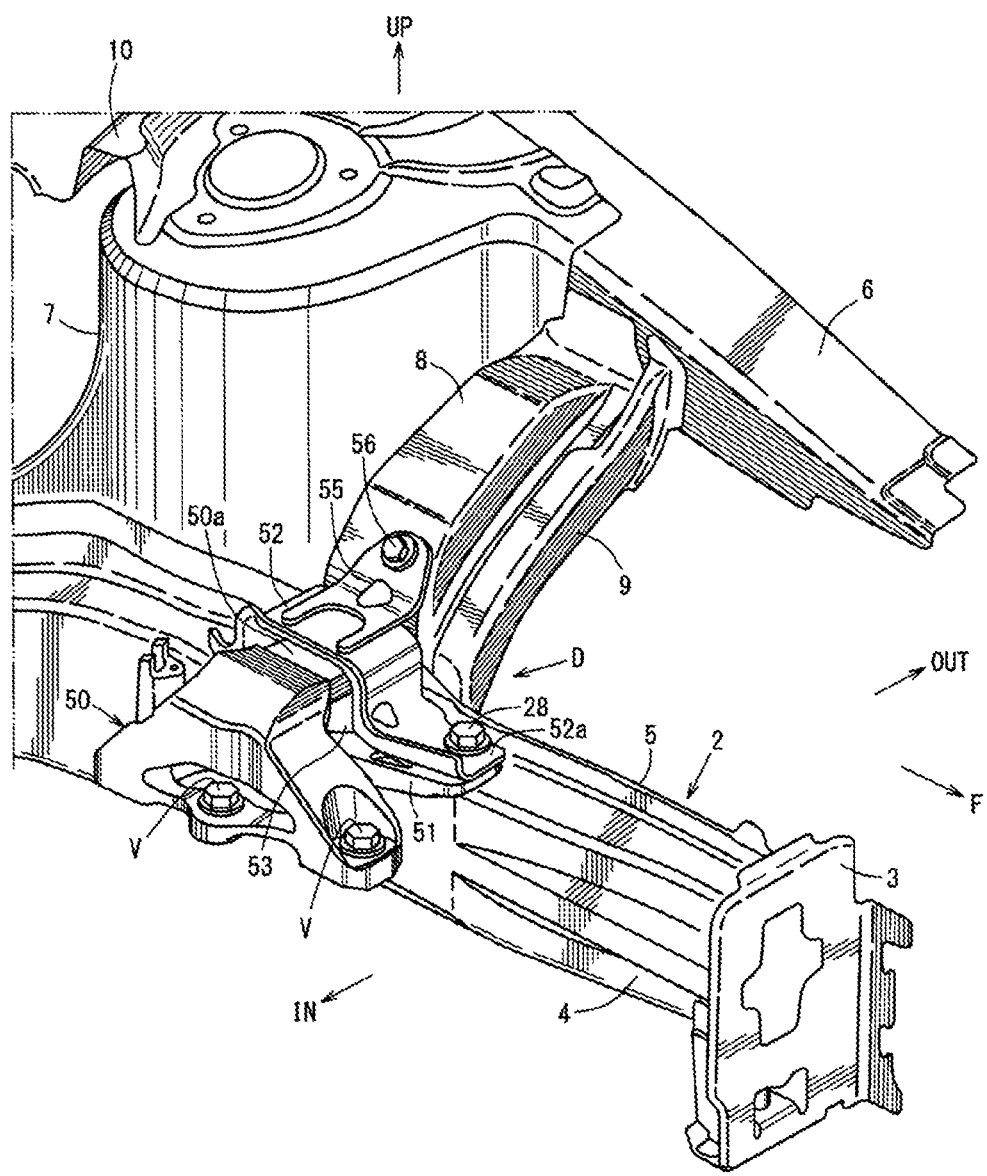
FIG. 11 is a perspective view showing a structure of a left-side powertrain mount of FIG. 1.
Figure 12A:
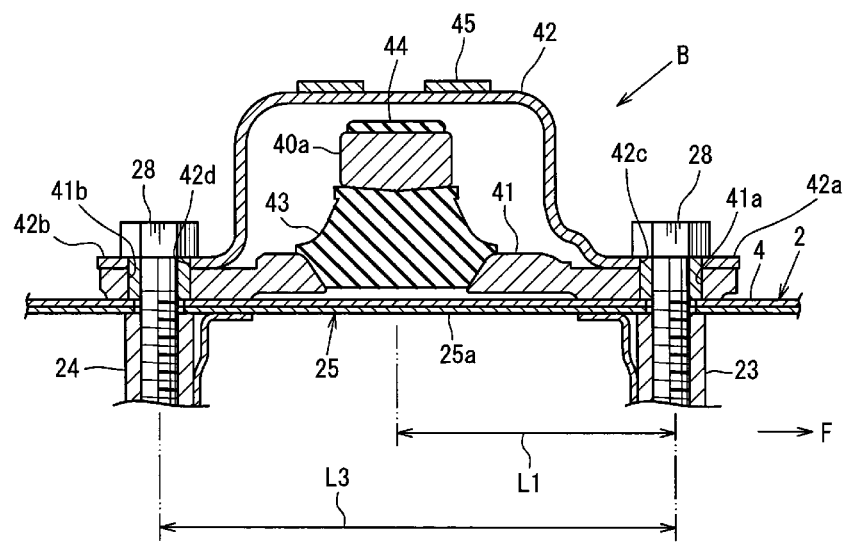
FIG. 12A is a major-part vertical sectional view of the structure of the powertrain mount of FIG. 10.
Figure 12B:
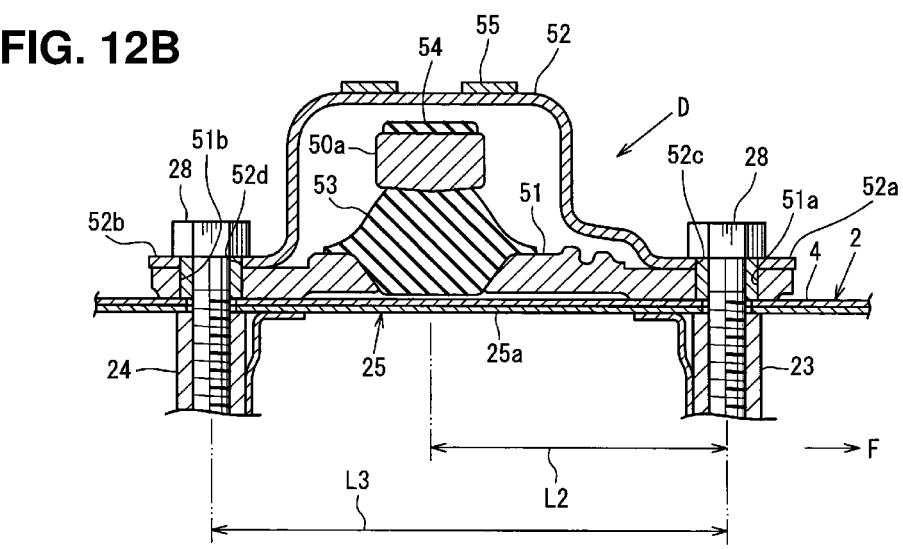
FIG. 12B is a major-part vertical sectional view of the structure of the powertrain mount of FIG. 11.

FIG. 10 is a perspective view showing a structure of a left-side powertrain mount of FIG. 1, FIG. 11 is a perspective view showing a structure of a left-side powertrain mount of FIG. 1, FIG. 12A is a major-part vertical sectional view of the structure of the powertrain mount of FIG. 10, and FIG. 12B is a major-part vertical sectional view of the structure of the powertrain mount of FIG. 11.

As shown in FIGS. 1, 10 and 12A, the transmission-side mount support portion B for the powertrain 13 comprises a transmission-side mount bracket 40, a die-cast-made lower bracket 41 and a sheet-metal-made upper bracket 42 which are vehicle-body-side mount brackets, and mount rubbers 43, 44. The lower bracket 41 is configured to extend in the vehicle longitudinal direction along an upper face of the front side frame inner 4, and attaching holes 41a, 41b for the bolts 28, 28 are formed at front-and-left both sides of the lower bracket 41.

The upper bracket 42 is configured in a hat shape, when viewed in the vehicle width direction, and attaching holes 42a, 42b for the bolts 28, 28 are formed at front-and-left both sides of the upper bracket 42.

The transmission-side mount bracket 40 includes an extension portion 40a which extends toward the front side frame 2, and the mount rubber 43 is provided between this extension portion 40a and the lower bracket 41 and the mount rubber 44 is provided at an upper portion of the extension portion 40a.

Herein, a longitudinal distance L3 between the respective axial center portions of the front-and-rear attaching holes 41a, 41b and a longitudinal distance L3 between the respective axial center portions of the front-and-rear attaching holes 42c, 42d are set to be the same as (equal to) the longitudinal distance L3 between the respective axial center portions of the nut members 23, 24 shown in FIG. 5, and a distance between each axial center portion of the front-side attaching holes 41a, 42c and the central portion, in the longitudinal direction, of the mount rubber 43 is set as L1. Further, the longitudinal distance L3 between the front-and-rear attaching points of the lower bracket 41 and the upper bracket 42 is set to be longer than the longitudinal length of the mount rubber 43.

The lower bracket 41 and the upper bracket 42 are fixed to the upper face portion of the front side frame inner 4 by using a pair of front-and-rear bolts 28, 28 and nut members 23, 24. Further, the upper bracket 42 is fixed to the wheel apron 8 by using a support piece 45 and a bolt 46 (see FIG. 10).

[Other Structures of Transmission-Side Mount Support Portion]

As shown in FIGS. 2, 11, and 12B, the transmission-side mount support portion D for the powertrain 16 comprises a transmission-side mount bracket 50, a die-cast-made lower bracket 51 and a sheet-plate-made upper bracket 52 which are vehicle-body-side mount brackets, and mount rubbers 53, 54. The lower bracket 51 is configured to extend in the vehicle longitudinal direction along an upper face of the front side frame inner 4, and attaching holes 51a, 51b for the bolts 28, 28 are formed at its front-and-rear both-side portions. The upper bracket 52 is configured in a hat shape, when viewed in the vehicle width direction, and attaching holes 52c, 52d for the bolts 28, 28 are formed at front-and-rear attaching seats 52a, 52b. The transmission-side mount bracket 50 includes an extension portion 50a which extends toward the font side frame 2, the mount rubber 53 is provided between the extension portion 50a and the lower bracket 51, and the mount rubber 54 is provided at an upper portion of the extension portion 50a.

Herein, a longitudinal distance L3 of respective axial center portions of the front-and-rear attaching holes 51a, 51b and a longitudinal distance L3 of respective axial center portions of the front-and-rear attaching holes 52c, 52d are set to be the same as (equal to) the longitudinal distance L3 of the respective axial center portions of the nut members 23, 24 shown in FIG. 5, and a distance between each of the axial center portions of the front-side attaching holes 51a, 52c and a central portion, in the longitudinal direction, of the mount rubber 53 is set as L2.

The distance L2 shown in FIG. 12B is set to be longer than the distance L1 shown in FIG. 12A. That is, a relational expression L2>L1 is established.

[Longitudinal Position Change of Mount Rubber]

Further, the longitudinal distance L3 between the front-and-rear attaching points of the lower bracket 51 is set to be longer than a longitudinal length of the mount rubber 53, and the longitudinal positions of the mount rubbers 43, 44, 53, 54 are configured to be changeable in a range between the longitudinal distance L3, i.e., at a position shown in FIG. 12A and a position shown in FIG. 12B.

That is, the mount support portions B, C, particularly, the mount rubbers 43, 53 which are held by the mount brackets 41, 51 are configured such that the longitudinal length thereof is changeable by exchanging the vehicle-body-side mount support portions B, C for each of the powertrains 13, 16. As shown in FIG. 12B, the above-described lower bracket 51 and upper bracket 52 are fixed to the upper face portion of the front side frame inner 4 by using a pair of front-and-rear bolts 28, 28 and nut members 23, 24. Further, the upper bracket 52 is fixed to the wheel apron 8 by using a support piece 55 and a bolt 56 (see FIG. 11).

As shown in FIG. 5, each of the front side frames 2 is configured to break at a frame breaking point X2 in the vehicle frontal collision, and the frame breaking point X2 of the transmission-side front side frame shown in the same figure is positioned right in front of the mount support portions B, D (the vehicle-body-side mount brackets 41, 42, 51, 52).

In comparison of the engine-side mount support portions A, C shown in FIGS. 9A, B with the transmission-side mount support portions B, D shown in FIGS. 12A, B, a rigidity of the vehicle-body-side mount brackets 31, 35 fixed to the engine-side front side frame 2 is set to be lower than that of the mount brackets 41, 42, 51, 52 fixed to the transmission-side front side frame 2 such that the mount brackets 31, 35 are made to break at a narrow portion 31a3 shown in FIG. 14 by a frame-breaking load which is generated in the vehicle frontal collision.

Further, the longitudinal distance L6 between the attaching points of the vehicle-side mount brackets 31, 35 fixed to the engine-side front side frame 2 shown in FIGS. 9A, B is set to be longer than the longitudinal length L3 between the attaching holes of the mount brackets 41, 42, 51, 52 fixed to the transmission-side front side frame 2 shown in FIG. 12A, B. That is, a relational expression L6>L3 is established.

That is, as descried above, in a case where the plural powertrains 13, 16 having the different longitudinal positions of the gravity center are selectively installed to the common vehicle body, the mount support portions A, B are used for installing the powertrain 13 shown in FIG. 1 so that the positions of the mount rubbers 32, 33, 43 shown in FIG. 15 can be secured. Meanwhile, when the powertrain 16 shown in FIG. 2 is installed, the mount support portions C, D are used, so that the positions of the mount rubbers 36, 37, 53 shown in FIG. 15 can be secured. In particular, the longitudinal positions of the mount rubbers 32, 33, 43, 36, 37, 53 can be changed by exchanging the mount brackets, and thereby the positions of the resilient roll axes Y1, Y2 (see FIGS. 1 and 2) relative to the gravity center positions of the powertrains 13, 16 are configured to be changeable.

[Specific Structure of Transmission-Side Mount Support Portion D]

Figure 16A:
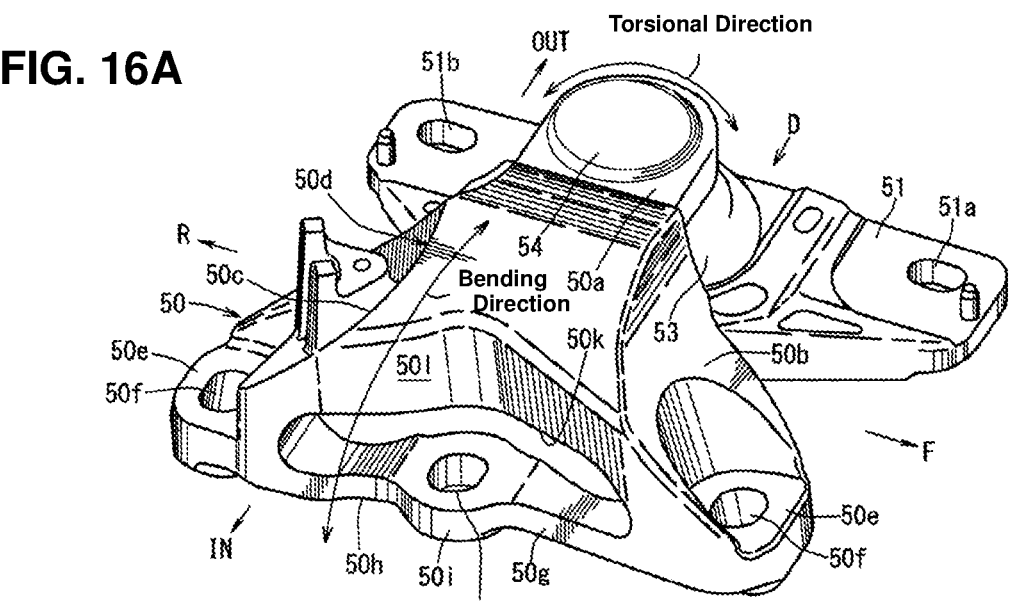
FIG. 16A is a perspective view of a transmission-side mount support portion.
Figure 16B:
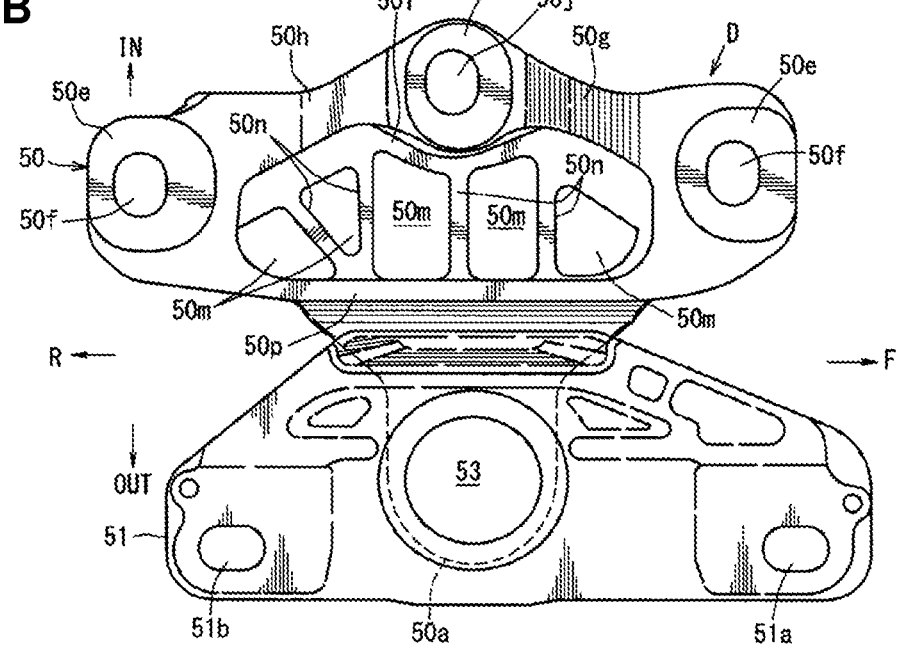
FIG. 16B is a bottom view of this mount support portion.
Figure 17A:
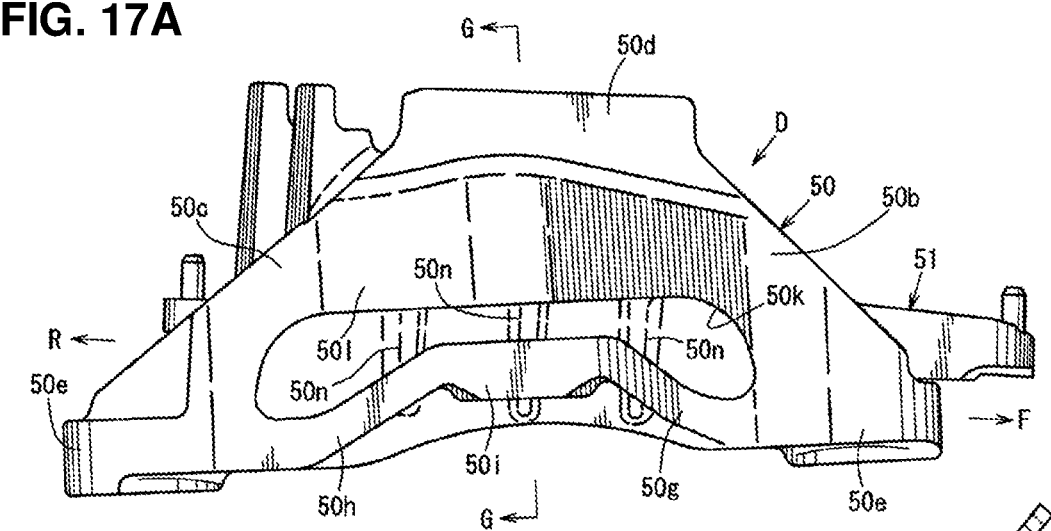
FIG. 17A is a side view of the mount support portion of FIG. 16A, when viewed from a vehicle inward side.
Figure 17B:
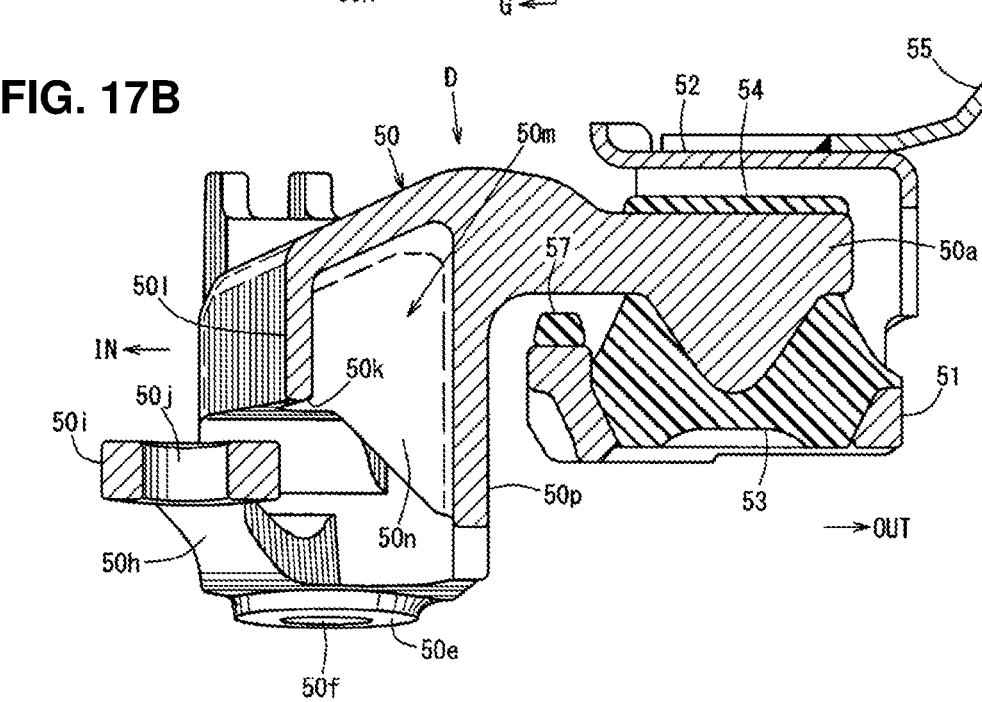
FIG. 17B is a sectional view taken along line G-G of FIG. 17A.

FIG. 16A is a perspective view of a transmission-side mount support portion D, and FIG. 16B is a bottom view of this mount support portion D. FIG. 17A is a side view of the mount support portion D of FIG. 16A, when viewed from a vehicle inward side, and FIG. 17B is a sectional view taken along line G-G of FIG. 17A.

As shown in FIGS. 16A, B and 17A, B, the transmission-side mount bracket 50 which is the powertrain-side mount bracket is made of an aluminum die-cast member. This transmission-side mount bracket 50 includes the above-described single extension portion 50a which extends outward, in the vehicle width direction, from a leg member 50d which comprises a front-side leg portion 50b which is configured to slant such that its rear side is positioned at a higher level than its front side and a rear-side leg portion 50c which is configured to slant such that its rear side is positioned at a lower level than its front side. This transmission-side mount bracket 50 is connected to the lower bracket 51 which is the vehicle-body-side mount bracket via the mount rubber 53 which is attached to the extension portion 50a.

As shown in FIG. 17A, an opening angle of the above-described front-side and rear-side leg portions 50b, 50c is set at about 95 degrees, but this opening angle is not limited to the above-described specific angle. At the respective lower end portions of the font-side and rear-side leg portions 50b, 50c are respectively formed attaching seats 50e, 50e and attaching holes 50f, 50f. A connection portion 50g which extends inward and upward toward a vehicle rearward side from the front-side attaching seat 50e and a connection portion 50h which extends inward and upward toward a vehicle forward side from the rear-side attaching seat 50e are also formed. A middle attachment (fixation) portion 50i is formed at a point where the above-described connection portions 50g, 50h are continuous to each other.

As shown in FIG. 16B, the above-described middle attachment (fixation) portion 50i is positioned inward, in the vehicle width direction, relative to the attaching holes 50F, 50f of the front-side and rear-side leg portions 50b, 50c, whereby a rigidity-reduction portion which has a rigidity against a load applied in the vehicle width direction (a bending load) which is lower than that of the front-side and rear-side leg portions 50b, 50c is provided. Further, an attaching hole 50j is formed at the above-described middle attachment (fixation) portion 50i.

While the above-described rigidity-reduction portion is provided adjacently to the above-described middle attachment (fixation) portion 50i, an opening portion 50k which is formed at a position located above the connection portions 50g, 50h and between the front-side and rear-side leg portions 50b, 50c also constitutes the rigidity-reduction portion in addition to the above-described inward-positioning structure of the middle attachment (fixation) portion 50i in the present embodiment. This opening portion 50k is enclosed by the connection portions 50g, 50h, the middle attachment (fixation) portion 50i, and a vertical wall portion 50l which will be described. The above-described connection portions 50g, 50h connect the front-side and rear-side leg portions 50b, 50c substantially in the vehicle longitudinal direction.

The vertical wall portion 50l is formed above the above-described opening portion 50k between the front-and-rear leg portions 50b, 50c, and as shown in the bottom view of FIG. 16B, a lightening hole portion 50m is formed inside the vertical wall portion 50l at a position between the vertical wall portion 50l and a vertical wall portion 50p which is spaced outward, in the vehicle width direction, apart from the vertical wall portion 50l. The rigidity-reduction portion is also constituted by this lightening hole portion 50m. Further, plural ribs 50n, 50n . . . are provided to be bridged inside the above-described lightening hole portion 50m (i.e., between the vertical wall portions 50l, 50p) (see FIGS. 16B and 17B).

Herein, the transmission-side mount bracket 50 is connected to the transmission 15 by using bolts V (see FIGS. 2 and 11) to be inserted into the above-described attaching holes 50f, 50f, 50j. Further, in the present embodiment, another mount rubber 57 than the above-described mount rubbers 53, 54 are provided as shown in FIG. 17B. These mount rubbers 53, 54, 57 perform the shock-absorbing function as members which are interposed between vibrated members of the transmission 15. Further, illustration of the upper bracket 52 and the support piece 55 is omitted in FIGS. 16A, 16B and 17A for convenience shake.

Herein, in the figures, an arrow F shows a vehicle forward side, an arrow R shows a vehicle rearward side, an arrow IN shows an inward side in the vehicle width direction, an arrow OUT shows an outward side in the vehicle width direction, and an arrow UP shows a vehicle upward side.

As described above, the powertrain mount structure of the vehicle of the first embodiment comprises the powertrain-side mount bracket (the transmission-side mount bracket 50) including the leg member 50d and the single extension portion 50a, the leg member 50d comprising the front-side leg portion 50b and the rear-side leg portion 50c which are spaced apart from each other in the vehicle longitudinal direction and respectively fixed to the powertrain 13 (16), the single extension portion 50a being provided to extend outward in the vehicle width direction from the upper end of the leg member 50d, the mount rubber 53 which is attached to the extension portion 50a of the powertrain-side mount bracket (the transmission-side mount bracket 50), and the vehicle-body-side mount bracket (the lower bracket 51) provided to be connected to the powertrain-side mount bracket (the transmission-side mount bracket 50) via the mount rubber 53 and fixed to the vehicle body, wherein the powertrain-side mount bracket (the transmission-side mount bracket 50) includes the connection portions 50g, 50h which connect the front-side leg portion 50*b* and the rear-side leg portion 50*c*, the middle attachment (fixation) portion 50*i* which is provided at the connection portions 50*g*, 50*h* at the position located between the front-side leg portion 50*b* and the rear-side leg portion 50*c* and fixed to the powertrain 13 (16), and the rigidity-reduction portion (see the opening portion 50*k*, the lightening hole portion 50*m*, the inward-positioning structure of the middle attachment (fixation) portion 50*i*) which has the rigidity against the load applied in the vehicle width direction which is lower than that of the front-side leg portion 50*b* and the rear-side leg portion 50*c* and is provided at the position located in the vicinity of the middle attachment (fixation) portion 50*i* (see FIGS. 16A, B and 17A, B).

Figure 22C:
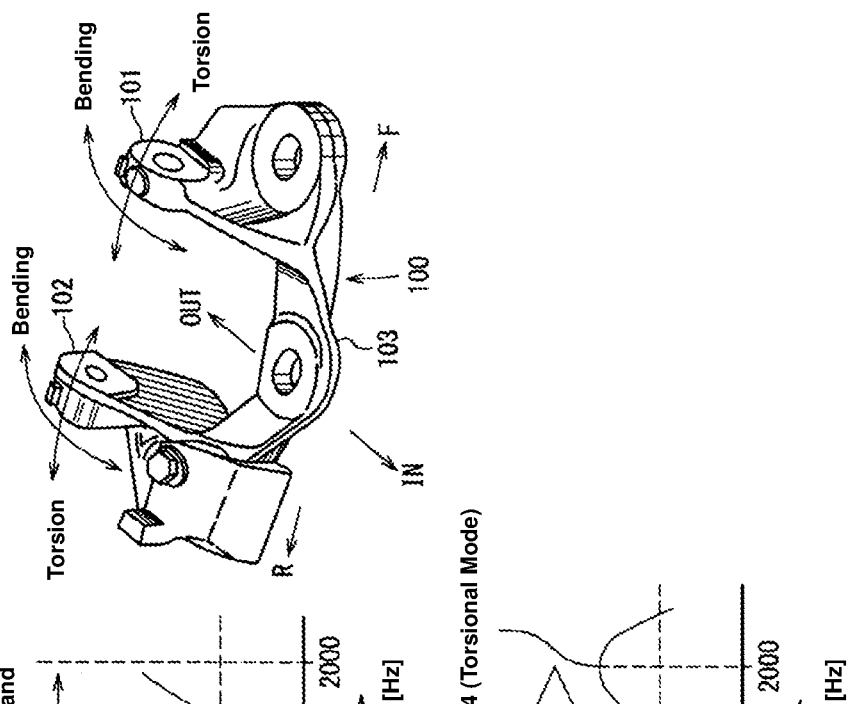
FIG. 22C is a perspective view of a conventional powertrain-side mount bracket.
Figure 22A:
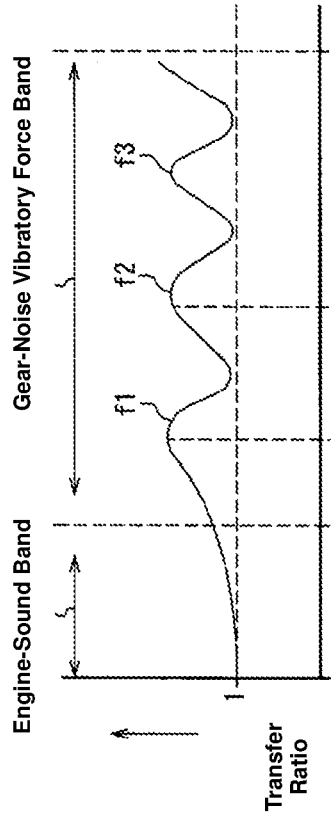
FIG. 22A is a diagram showing a conventional resilient (elastic) vibration transfer characteristic.
Figure 22B:
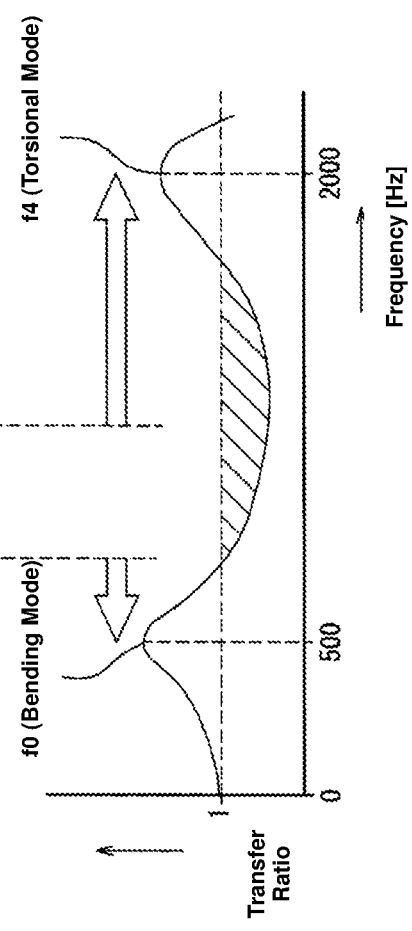
FIG. 22B is a diagram showing an ideal resilient (elastic) vibration transfer characteristic.

According to the present structure, the rigidity against the torsion (see an arrow in FIG. 12) of the powertrain-side mount bracket (see the transmission-side mount bracket 50) (the roll rigidity and the like) can be improved by the connection portions 50*g*, 50*h* and the middle attachment (fixation) portion 50*i*. Further, the increase of the bending (see the arrow in FIG. 12) rigidity can be suppressed by forming the above-described rigidity reduction portion. Consequently, the torsional resonance point can be set in the high frequency range and also the bending resonance point can be set in the low frequency range, so that the resilient (elastic) vibration transfer characteristic can be made to substantially match an ideal resilient (elastic) vibration transfer characteristic shown in FIG. 22B.

Herein, in a case where the rigidity of the powertrain-side mount bracket is reduced by the above-described rigidity reduction portion, if the rigidity of the vertical direction and the longitudinal direction is reduced, not only the roll rigidity but the rigidity against a load input from a road surface in the vertical direction decrease, so that the rigidity of the vehicle width direction where a large load is not inputted can be reduced.

In the present embodiment, the rigidity-reduction portion of the powertrain-side mount bracket (the transmission-side mount bracket 50) is the opening portion 50*k* which is formed at the position located above the connection portions 50*g*, 50*h* and between the front-side leg portion 50*b* and the rear-side leg portion 50*c* (see FIGS. 16A, B and 17A, B).

According to this structure, the reduction of the rigidity of the vehicle width direction (i.e., the bending direction) of the powertrain-side mount bracket (the transmission-side mount bracket 50) can be achieved by forming the opening portion 50*k*.

In the present embodiment, the powertrain-side mount bracket (the transmission-side mount bracket 50) includes the vertical wall portion 50*l* which is formed between the front-side leg portion 50*b* and the rear-side leg portion 50*c*, and the rigidity-reduction portion of the powertrain-side mount bracket (the transmission-side mount bracket 50) is the lightening hole portion 50*m* which is formed inside the vertical wall portion 50*l* (see FIGS. 16A, B and 17A, B).

According to this structure, the reduction of the rigidity of the vehicle width direction of the powertrain-side mount bracket (the transmission-side mount bracket 50) and also weight reduction can be achieved by forming the lightening hole portion 50*m*.

In the present embodiment, the powertrain-side mount bracket (the transmission-side mount bracket 50) includes the ribs 50*n* which are provided at the vertical wall portion 50*l* in an area where the lightening hole portion 50*m* is formed such that the ribs 50*n* are bridged inside the lightening hole portion 50*m* (see FIGS. 16A, B and 17A, B).

According to this structure, excessive reduction of the rigidity of the vehicle width direction can be suppressed by the ribs 50*n*.

In the present embodiment, the rigidity-reduction portion of the powertrain-side mount bracket (the transmission-side mount bracket 50) is formed by positioning the middle attachment (fixation) portion 50*i* inward, in the vehicle width direction, relative to the fixation position (see the attaching holes 50*f*, 50*f*) of the front-side leg portion 50*b* and the rear-side leg portion 50*c* which are fixed to the powertrain 13 (16) (see FIGS. 16A, B and 17A, B).

According to this structure, the reduction of the rigidity of the vehicle width direction of the powertrain-side mount bracket (the transmission-side mount bracket 50) can be achieved by positioning the middle attachment (fixation) portion 50*i* inward, in the vehicle width direction, relative to the fixation position of the front-side leg portion 50*b* and the rear-side leg portion 50*c* which are fixed to the powertrain 13 (16).

In the present embodiment, the rigidity-reduction portion of the powertrain-side mount bracket (the transmission-side mount bracket 50) is formed by the middle attachment (fixation) portion 50*i* which is positioned at the point where the connection portions 50*g*, 50*h* extending inward from the front-side leg portion 50*b* and the rear-side leg portion 50*c*, respectively, are continuous to each other (see FIGS. 16A, B and 17A, B).

According to this structure, the reduction of the rigidity of the vehicle width direction of the powertrain-side mount bracket (the transmission-side mount bracket 50) can be achieved by forming the middle attachment (fixation) portion 50*i* which is positioned at the point where the connection portions 50*g*, 50*h* extending inward from the front-side leg portion 50*b* and the rear-side leg portion 50*c*, respectively, are continuous to each other.

Embodiment 2

Figure 18A:
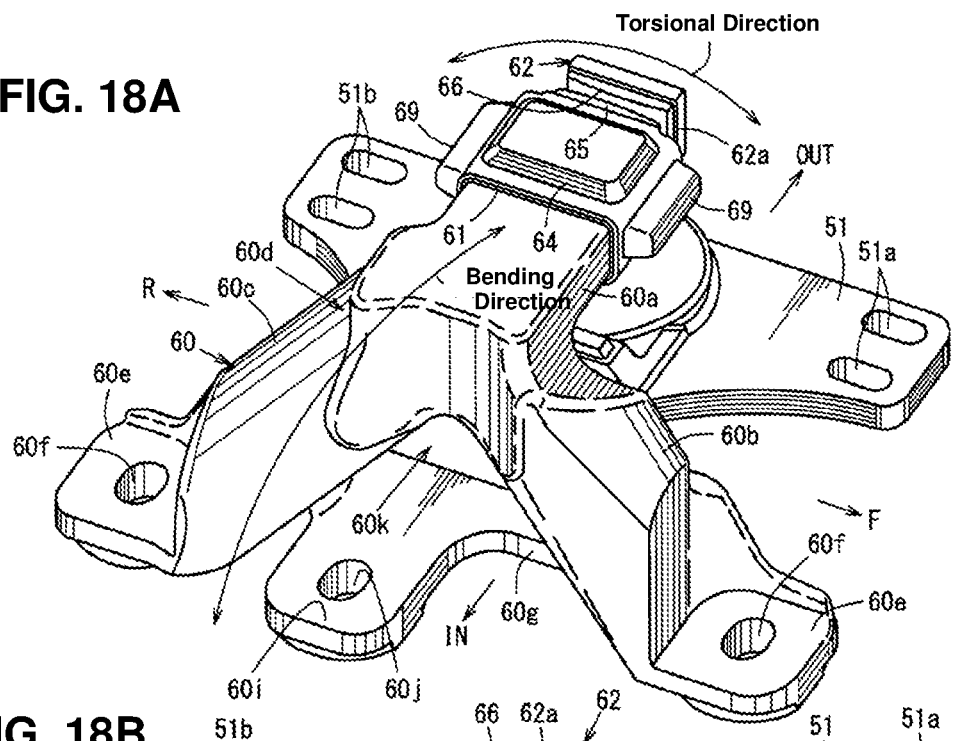
FIG. 18A is a perspective view of a transmission-side mount support portion of another embodiment.
Figure 18B:
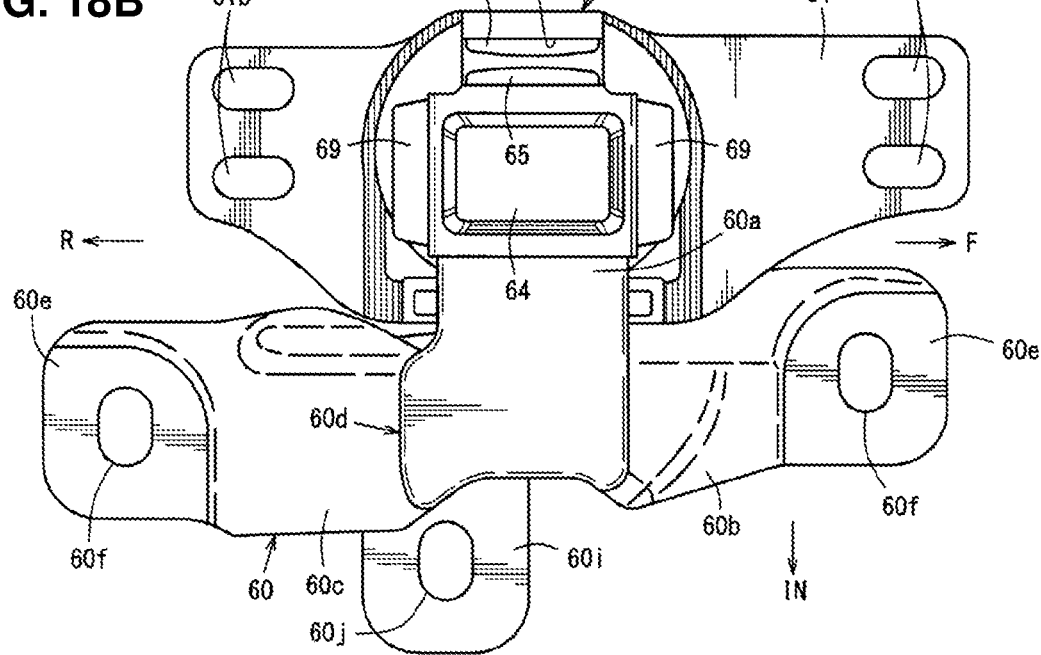
FIG. 18B is a plan view of this mount support portion.
Figure 19A:
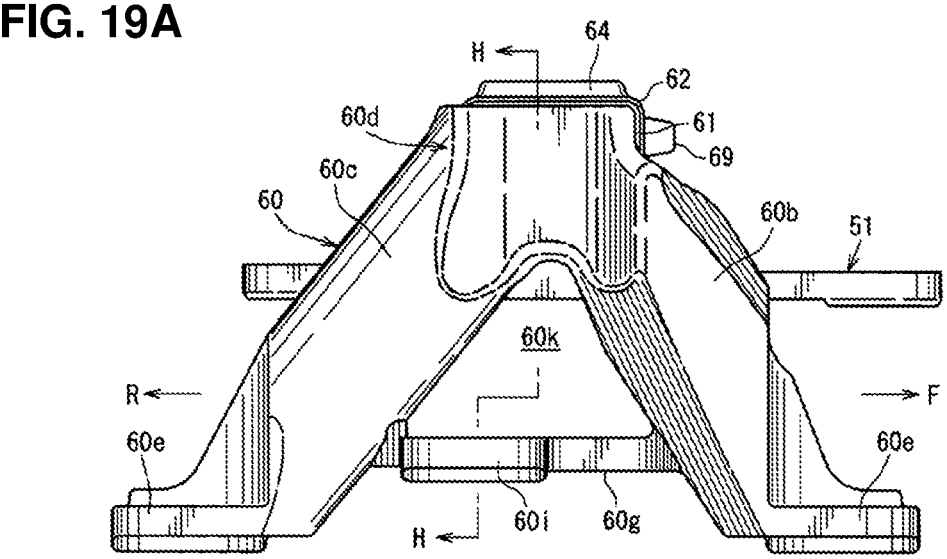
FIG. 19A is a side view of the mount support portion of FIG. 18A, when viewed from the vehicle inward side.
Figure 19B:
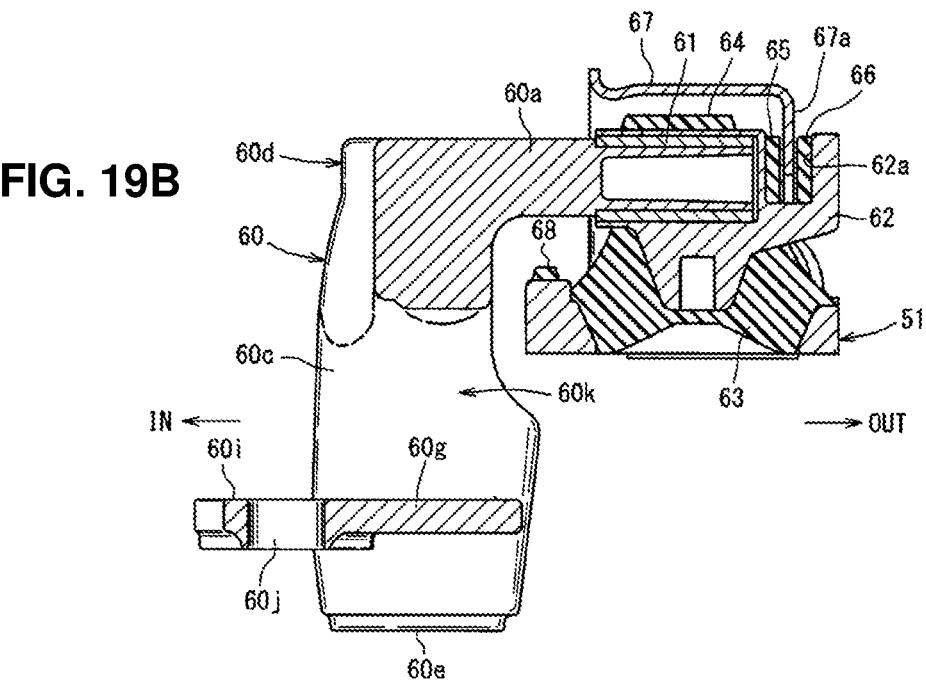
FIG. 19B is a sectional view taken along line H-H of FIG. 19A.

FIGS. 18A, B and FIGS. 19A, B show a second embodiment of the powertrain mount structure of the vehicle. FIG. 18A is a perspective view of a transmission-side mount support portion of another embodiment and FIG. 18B is a plan view of this mount support portion, and FIG. 19A is a side view of the mount support portion of FIG. 18A, when viewed from the vehicle inward side, and FIG. 19B is a sectional view taken along line H-H of FIG. 19A.

As shown in FIGS. 18A, B and 19A, B, a transmission-side mount bracket 60 which is the powertrain-side mount bracket is made of an aluminum die-cast member. This transmission-side mount bracket 60 includes a single extension portion 60*a* which extends outward from an upper end of a leg member 60*d* which comprises a front-side leg portion 60*b* which is configured to slant such that its rear side is positioned at a higher level than its front side and a rear-side leg portion 60*c* which is configured to slant such that its rear side is positioned at a lower level than its front side. This transmission-side mount bracket 60 is connected to the lower bracket 51 which is the vehicle-body-side mount bracket via a metal-made outer tube 61 which is attached to the extension portion 60*a*, a plastic-made inner core 62, and a mount rubber 63. As shown in FIG. 19A, an opening angle of the above-described front-side and rear-side leg portions 60*b*, 60*c* is set at about 70 degrees, but this opening angle is not limited to the above-described specific angle.

Another mount rubber 64 than the above-described mount rubber 63 is provided at an upper portion of an extension end of the extension portion 60a. Mount rubbers 65, 66 are provided in a recess portion 62a which is provided at an outward side, in the vehicle width direction, of an upper portion of the inner core 62 such that they face each other, and a hanging piece 67a of a stopper 67 is arranged between these rubbers 65, 66. Further, a mount rubber 68 is also provided at an upper portion of an inward side, in the vehicle width direction, of the above-described lower bracket 51. Also, mount rubbers 69, 69 are provided at front-and-rear both portions of the above-described extension portion 60a. At respective lower end portions of the front-side and rear-side leg portions 60b, 60c are formed attaching seats 60e, 60e and attaching holes 60f, 60f. These leg portions 60b, 60c are connected by a connection portion 60g which extends linearly in the vehicle longitudinal direction at a middle position, in the vertical direction, between the attaching seats 60e and the lower bracket 51.

A middle attachment (fixation) portion 60i is formed at a position which is located inward, in the vehicle width direction, of the connection portion 60g, and an attaching hole 60j is formed at this middle attachment (fixation) portion 60i. A rigidity-reduction portion against the load applied in the vehicle width direction (the bending load) is provided adjacently to the middle attachment (fixation) portion 60i. In the present embodiment, this rigidity-reduction portion is an opening portion 60k which is formed at a position located above the connection portion 60g and between the front-side and rear-side leg portions 60b, 60c.

Further, the rigidity-reduction portion is also formed by a structure where the above-described middle fixation portion 60i is positioned inward, in the vehicle width direction, relative to an attachment (fixation) position of the front-side and rear-side leg portions 60b, 60c (see the position of the attaching holes 60f, 60f). The transmission-side mount bracket 60 is connected to the transmission 15 by using the bolts V (see FIGS. 2 and 11) to be inserted into the above-described attaching holes 60f, 60f, 60j. Further, the above-described rubbers 63-66, 68, 69 perform the shock-absorbing function as members which are interposed between vibrated members of the transmission 15. Illustration of the stopper 67 is omitted in FIGS. 18A, B and 19A for convenience shake.

As described above, the powertrain mount structure of the vehicle of the second embodiment comprises the powertrain-side mount bracket (the transmission-side mount bracket 60) including the leg member 60d and the single extension portion 60a, the leg member 60d comprising the front-side leg portion 60b and the rear-side leg portion 60c which are spaced apart from each other in the vehicle longitudinal direction and respectively fixed to the powertrain 13 (16), the single extension portion 60a being provided to extend outward in the vehicle width direction from the upper end of the leg member 60d, the mount rubber 63 which is attached to the extension portion 60a of the powertrain-side mount bracket (the transmission-side mount bracket 60), and the vehicle-body-side mount bracket (the lower bracket 51) provided to be connected to the powertrain-side mount bracket (the transmission-side mount bracket 60) via the mount rubber 63 and fixed to the vehicle body, wherein the powertrain-side mount bracket (the transmission-side mount bracket 60) includes the connection portion 60g which connects the front-side leg portion 60b and the rear-side leg portion 60c, the middle attachment (fixation) portion 60i which is provided at the connection portion 60g at the position located between the front-side leg portion 60b and the rear-side leg portion 60c and fixed to the powertrain 13 (16), and the rigidity-reduction portion (see the opening portion 60k) which has the rigidity against the load applied in the vehicle width direction which is lower than that of the front-side leg portion 60b and the rear-side leg portion 60c and is provided at the position located in the vicinity of the middle attachment (fixation) portion 60i (see FIGS. 18A, B and 19A, B).

According to the present structure, the rigidity against the torsion (see an arrow in FIG. 18) of the powertrain-side mount bracket (see the transmission-side mount bracket 60) (the roll rigidity and the like) can be improved by the connection portion 60g and the middle attachment (fixation) portion 60i. Further, the increase of the bending (see the arrow in FIG. 18) rigidity can be suppressed by forming the rigidity reduction portion. Consequently, the torsional resonance point can be set in the high frequency range and also the bending resonance point can be set in the low frequency range, so that the resilient (elastic) vibration transfer characteristic can be made to substantially match an ideal resilient (elastic) vibration transfer characteristic shown in FIG. 22B.

In the present embodiment, the rigidity-reduction portion of the powertrain-side mount bracket (the transmission-side mount bracket 60) is the opening portion 60k which is formed at the position located above the connection portion 60g and between the front-side leg portion 60b and the rear-side leg portion 60c (see FIGS. 18A, B and 18A, B).

According to this structure, the reduction of the rigidity of the vehicle width direction (i.e., the bending direction) of the powertrain-side mount bracket (the transmission-side mount bracket 60) can be achieved by forming the opening portion 60k.

In the present embodiment, the rigidity-reduction portion of the powertrain-side mount bracket (the transmission-side mount bracket 60) is formed by positioning the middle attachment (fixation) portion 60i inward, in the vehicle width direction, relative to the fixation position (see the attaching holes 60f, 60f) of the front-side leg portion 60b and the rear-side leg portion 60c which are fixed to the powertrain 13 (16) (see FIGS. 18A, B and 19A, B).

According to this structure, the reduction of the rigidity of the vehicle width direction of the powertrain-side mount bracket (the transmission-side mount bracket 60) can be achieved by positioning the middle attachment (fixation) portion 60i inward, in the vehicle width direction, relative to the fixation position of the front-side leg portion 60b and the rear-side leg portion 60c which are fixed to the powertrain 13 (16).

In the present embodiment, the connection portion 60g of the powertrain-side mount bracket (the transmission-side mount bracket 60) is configured to linearly connect the front-side leg portion 60b and the rear-side leg portion 60c, and the rigidity-reduction portion of the powertrain-side mount bracket (the transmission-side mount bracket 60) is formed by the middle fixation portion 60i which is positioned inward, in the vehicle width direction, relative to the linear connection portion 60g (see FIGS. 18A, B and 19A, B).

According to this embodiment, the reduction of the rigidity of the vehicle width direction of the powertrain-side mount bracket (the transmission-side mount bracket 60) can be achieved by forming the middle fixation portion 60i which is positioned inward, in the vehicle width direction, relative to the linear connection portion 60g.

The same portions of the second embodiment shown in FIGS. 18A, B and 19A, B as those shown in the previous figures are denoted by the same reference characters, specific descriptions of which are omitted.

Embodiment 3

Figure 20A:
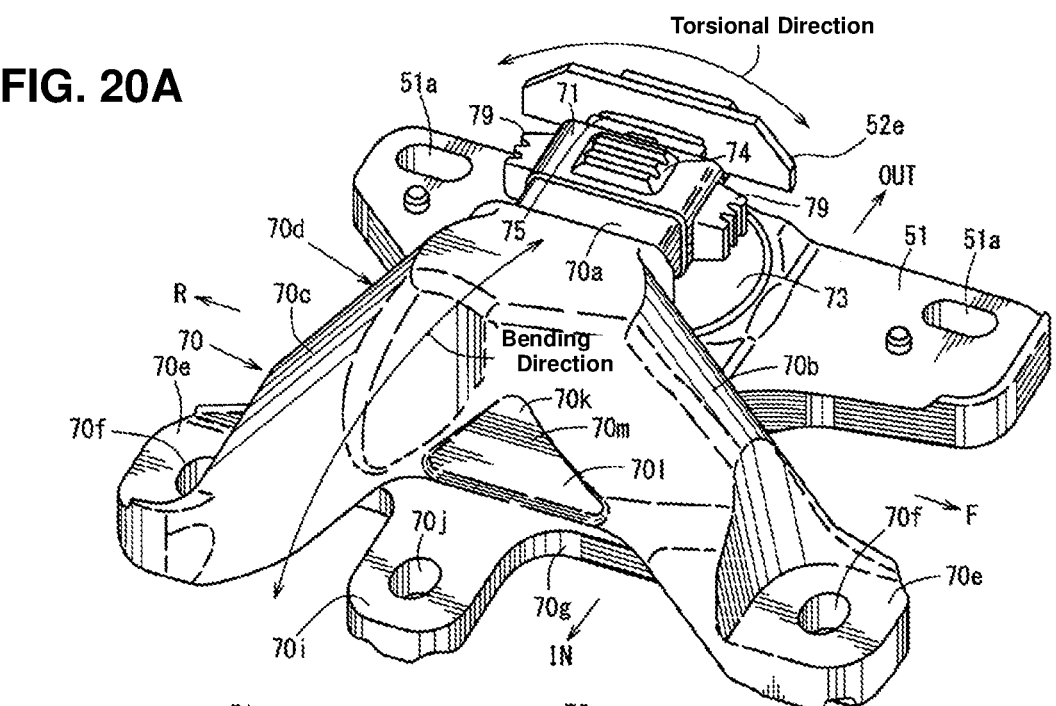
FIG. 20A is a perspective view of a transmission-side mount support portion of further another embodiment.
Figure 20B:
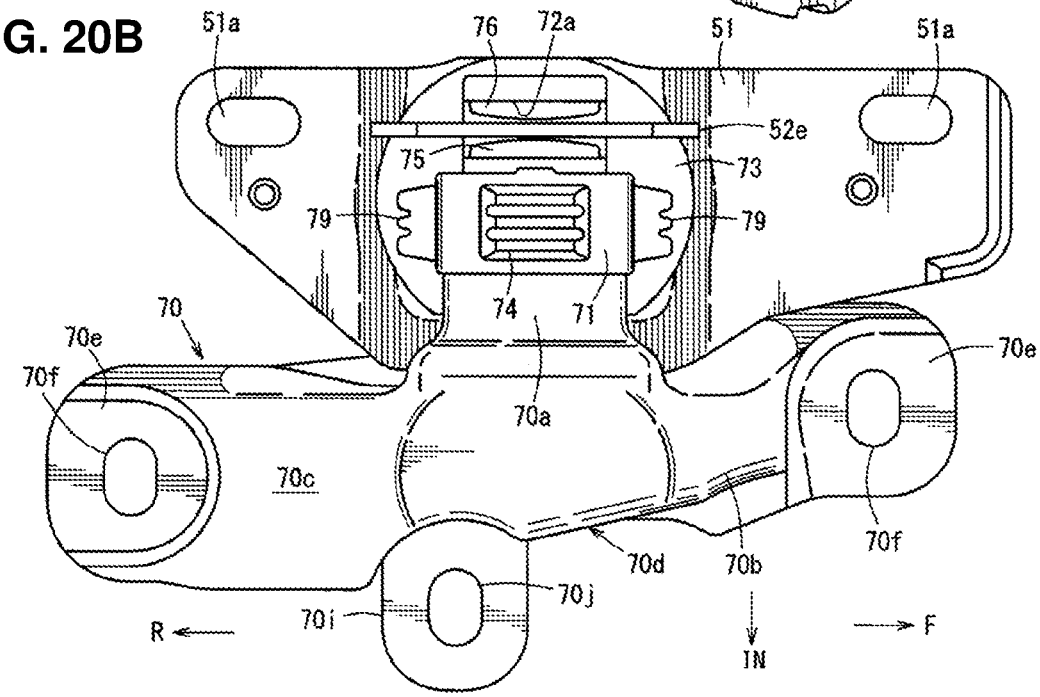
FIG. 20B is a plan view of this mount support portion.
Figure 21A:
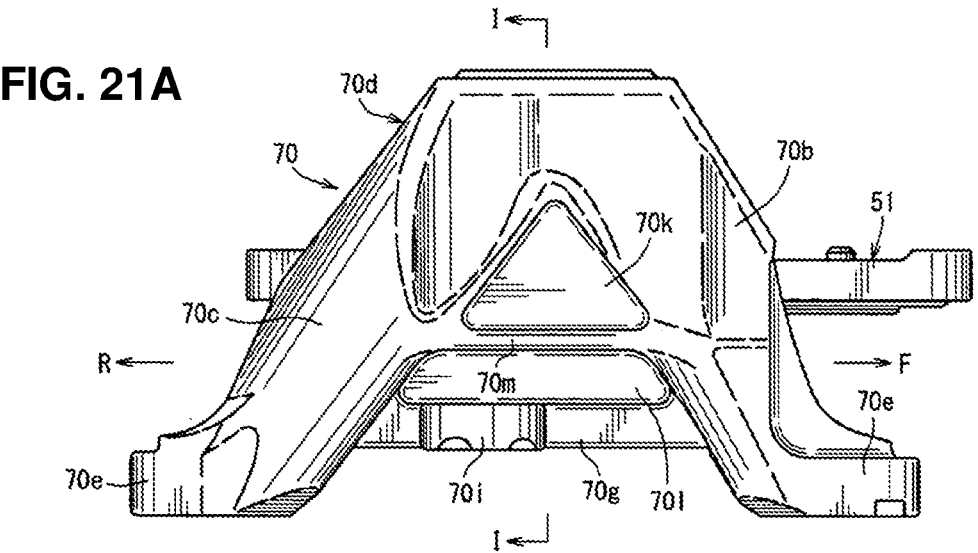
FIG. 21A is a side view of the mount support portion of FIG. 20A, when viewed from the vehicle inward side.
Figure 21B:
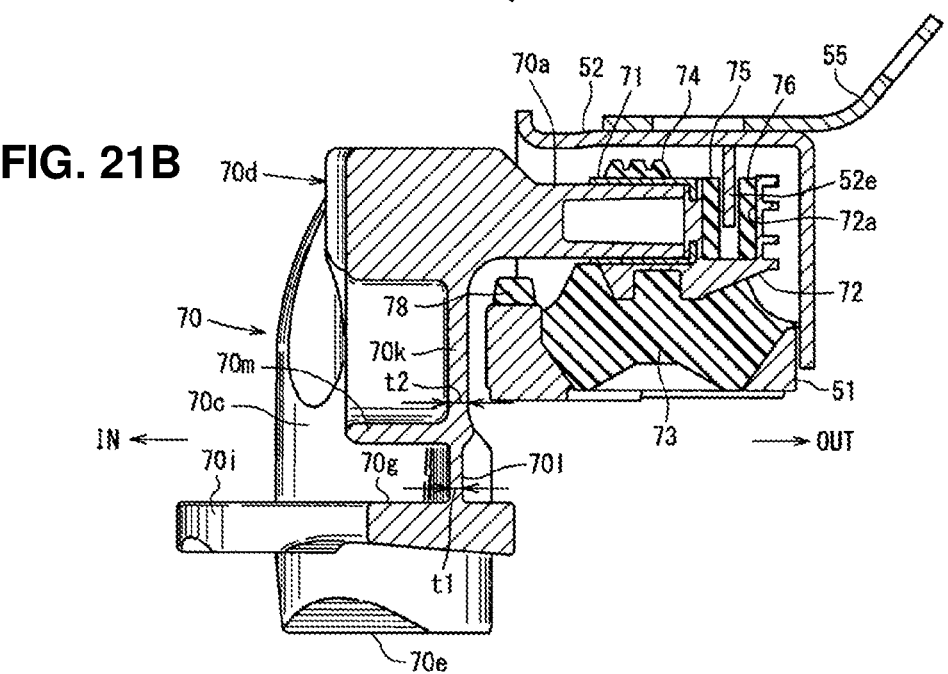
FIG. 21B is a sectional view taken along line I-I of FIG. 21A.

FIGS. 20A, B and 21A, B show a third embodiment of the powertrain mount structure of the vehicle. FIG. 20A is a perspective view of a transmission-side mount support portion of further another embodiment, FIG. 20B is a plan view of this mount support portion, FIG. 21A is a side view of the mount support portion of FIG. 20A, when viewed from the vehicle inward side, and FIG. 21B is a sectional view taken along line I-I of FIG. 21A.

As shown in FIGS. 20A, B and 21A, B, a transmission-side mount bracket 70 which is the powertrain-side mount bracket is made of an aluminum die-cast member. This transmission-side mount bracket 70 includes a single extension portion 70a which extends outward from an upper end of a leg member 70d which comprises a front-side leg portion 70b which is configured to slant such that its rear side is positioned at a higher level than its front side and a rear-side leg portion 70c which is configured to slant such that its rear side is positioned at a lower level than its front side. This transmission-side mount bracket 70 is connected to the lower bracket 51 which is the vehicle-body-side mount bracket via a metal-made outer tube 71 which is attached to the extension portion 70a, a plastic-made inner core 72, and a mount rubber 73. As shown in FIG. 21A, an opening angle of the above-described front-side and rear-side leg portions 70b, 70c is set at about 70 degrees, but this opening angle is not limited to the above-described specific angle.

Another mount rubber 74 than the above-described mount rubber 73 is provided at an upper portion of an extension end of the extension portion 70a. Mount rubbers 75, 76 are provided in a recess portion 72a which is provided at an outward side, in the vehicle width direction, of an upper portion of the inner core 72 such that they face each other, and a hanging piece 52e which hangs from the upper bracket 52 is arranged between these rubbers 75, 76. Further, a mount rubber 78 is also provided at an upper portion of an inward side, in the vehicle width direction, of the above-described lower bracket 51. Also, mount rubbers 79, 79 are provided at front-and-rear both portions of the above-described extension portion 70a. At respective lower end portions of the front-side and rear-side leg portions 70b, 70c are formed attaching seats 70e, 70e and attaching holes 70f, 70f. These leg portions 70b, 70c are connected by a connection portion 70g which extends linearly in the vehicle longitudinal direction at a middle position, in the vertical direction, between the attaching seats 70e and the lower bracket 51.

A middle attachment (fixation) portion 70i is formed at a position which is located inward, in the vehicle width direction, of the connection portion 70g, and an attaching hole 70j is formed at this middle attachment (fixation) portion 70i. A rigidity-reduction portion against the load applied in the vehicle width direction (the bending load) is provided adjacently to the middle attachment (fixation) portion 70i.

In the present embodiment, this rigidity-reduction portion is constituted by thin vertical wall portions 70k, 70l which are formed at a position located above the connection portion 70g and between the front-side leg portion 70b and the rear-side leg portion 70c, wherein the thin wall portions 70k, 70l respectively have a narrower width (in the vehicle width direction) than the front-side leg portion 70b and the rear-side leg portion 70c.

As shown in FIG. 21B, a thickness t2 of the upper-side thin vertical wall portion 70k is set to be extremely smaller than the width, in the vehicle width direction, of the leg portions 70b, 70c, and a thickness t1 of the lower-side thin vertical wall portion 70l is set to be further smaller than the thickness t2 of the upper-side thin vertical wall portion 70k. The above-described rigidity-reduction portion is formed by the upper-side and lower-side thin vertical wall portions 70k, 70l.

Further, a rib 70m which extends inward in the vehicle width direction is formed between the upper-side and lower-side thin vertical wall portions 70k, 70l, whereby an excessive decrease of the rigidity is prevented.

Further, the rigidity-reduction portion is also formed by a structure where the above-described middle fixation portion 70i is positioned inward, in the vehicle width direction, relative to an attachment (fixation) position of the front-side and rear-side leg portions 70b, 70c (see the position of the attaching holes 70f, 70f). The transmission-side mount bracket 70 is connected to the transmission 15 by using the bolts V (see FIGS. 2 and 11) to be inserted into the above-described attaching holes 70f, 70f, 70j. Further, the above-described rubbers 73-76, 78, 79 perform the shock-absorbing function as members which are interposed between vibrated members of the transmission 15. Illustration of the upper bracket 52 and the support piece 55 is omitted in FIGS. 20A, B and 21A for convenience shake.

As described above, the powertrain mount structure of the vehicle of the second embodiment comprises the powertrain-side mount bracket (the transmission-side mount bracket 70) including the leg member 70d and the single extension portion 70a, the leg member 70d comprising the front-side leg portion 70b and the rear-side leg portion 70c which are spaced apart from each other in the vehicle longitudinal direction and respectively fixed to the powertrain 13 (16), the single extension portion 70a being provided to extend outward in the vehicle width direction from the upper end of the leg member 70d, the mount rubber 73 which is attached to the extension portion 70a of the powertrain-side mount bracket (the transmission-side mount bracket 70), and the vehicle-body-side mount bracket (the lower bracket 51) provided to be connected to the powertrain-side mount bracket (the transmission-side mount bracket 70) via the mount rubber 73 and fixed to the vehicle body, wherein the powertrain-side mount bracket (the transmission-side mount bracket 70) includes the connection portion 70g which connects the front-side leg portion 70b and the rear-side leg portion 70c, the middle attachment (fixation) portion 70i which is provided at the connection portion 70g at the position located between the front-side leg portion 70b and the rear-side leg portion 70c and fixed to the powertrain 13 (16), and the rigidity-reduction portion (see the opening portion 70k) which has the rigidity against the load applied in the vehicle width direction which is lower than that of the front-side leg portion 70b and the rear-side leg portion 70c and is provided at the position located in the vicinity of the middle attachment (fixation) portion 70i (see FIGS. 20A, B and 21A, B).

According to the present structure, the rigidity against the torsion (see an arrow in FIG. 20A) of the powertrain-side mount bracket (the transmission-side mount bracket 70) (the roll rigidity and the like) can be improved by the connection portion 70g and the middle attachment (fixation) portion 70i. Further, the increase of the bending (see the arrow in FIG. 20A) rigidity can be suppressed by forming the rigidity reduction portion. Consequently, the torsional resonance point can be set in the high frequency range and also the bending resonance point can be set in the low frequency range, so that the resilient (elastic) vibration transfer characteristic can be made to substantially match an ideal resilient (elastic) vibration transfer characteristic shown in FIG. 22B.

In the present embodiment, the rigidity-reduction portion of the powertrain-side mount bracket 70 is the thin vertical wall portions 70k, 70l which are formed at the position located above the connection portion 70g and between the front-side leg portion 70b and the rear-side leg portion 70c, the thin wall portions 70k, 70l having the narrower width than the front-side leg portion 70b and the rear-side leg portion 70c (see FIGS. 20A, B and 21A, B).

According to this embodiment, the reduction of the rigidity of the vehicle width direction of the powertrain-side mount bracket (the transmission-side mount bracket 70) can be achieved by forming the thin vertical wall portions 70k, 70l.

In the present embodiment, the rigidity-reduction portion of the powertrain-side mount bracket (the transmission-side mount bracket 70) is formed by positioning the middle attachment (fixation) portion 70i inward, in the vehicle width direction, relative to the fixation position (see the attaching holes 70f, 70o of the front-side leg portion 70b and the rear-side leg portion 70c which are fixed to the powertrain 13 (16) (see FIGS. 20A, B and 21A, B).

According to this structure, the reduction of the rigidity of the vehicle width direction of the powertrain-side mount bracket (the transmission-side mount bracket 70) can be achieved by positioning the middle attachment (fixation) portion 70i inward, in the vehicle width direction, relative to the fixation position of the front-side leg portion 70b and the rear-side leg portion 70c which are fixed to the powertrain 13 (16).

In the present embodiment, the connection portion 70g of the powertrain-side mount bracket (the transmission-side mount bracket 70) is configured to linearly connect the front-side leg portion 70b and the rear-side leg portion 70c, and the rigidity-reduction portion of the powertrain-side mount bracket (the transmission-side mount bracket 70) is formed by the middle fixation portion 70i which is positioned inward, in the vehicle width direction, relative to the linear connection portion 70g (see FIGS. 20A, B and 21A, B).

According to this embodiment, the reduction of the rigidity of the vehicle width direction of the powertrain-side mount bracket (the transmission-side mount bracket 70) can be achieved by forming the middle fixation portion 70i which is positioned inward, in the vehicle width direction, relative to the linear connection portion 70g.

The same portions of the third embodiment shown in FIGS. 20A, B and 21A, B as those shown in the previous figures are denoted by the same reference characters, specific descriptions of which are omitted.

In comparison of the above-described first, second and third embodiments, the structure of the above-described third embodiment is the most superior in the rigidity against the torsion and bending, the structure of the above-described second embodiment is not so superior in the rigidity against the torsion and bending, and the structure of the above-described first embodiment provides the medium-level rigidity against the torsion and bending. Accordingly, it is preferable that in a case where the rigidity of the powertrain is relatively high, the structure of the second embodiment is used, in a case where the rigidity of the powertrain is relatively low, the structure of the third embodiment be used, and in a case where the rigidity level of the powertrain is medium, the structure of the first embodiment be used.

In correspondence of the present invention to the above-described embodiments, the powertrain-side mount bracket of the present invention corresponds to the transmission-side mount brackets 50, 60, 70 of the embodiments. Likewise, the rigidity-reduction portion corresponds to the opening portions 50k, 60k, the lightening hole portion 50m, the thin vertical wall portions 70k, 70l, and the inward-positioning structure of the middle fixation portions 50i, 60i, 70i, and the vehicle-body-side mount bracket corresponds to the lower bracket 51. However, the present invention should to be limited to the above-described embodiment.

What is claimed is:

1. A powertrain mount structure of a vehicle comprising:
a powertrain-side mount bracket including a leg member and a single extension portion, the leg member comprising a front-side leg portion and a rear-side leg portion which are spaced apart from each other in a vehicle longitudinal direction and respectively fixed to a powertrain, the single extension portion being provided to extend outward in a vehicle width direction from an upper end of the leg member;
a mount rubber attached to the single extension portion of the powertrain-side mount bracket; and
a vehicle-body-side mount bracket provided to be connected to the powertrain-side mount bracket via the mount rubber and fixed to a vehicle body, wherein
said powertrain-side mount bracket includes
a connection portion, which connects said front-side leg portion and said rear-side leg portion;
a middle fixation portion, which is provided at said connection portion at a position located between the front-side leg portion and the rear-side leg portion and includes an attaching hole configured to be fixed to the powertrain; and
a rigidity-reduction portion, which has a rigidity against a load applied in the vehicle width direction that is lower than that of the front-side leg portion and the rear-side leg portion and is provided at a position located in a vicinity of said middle fixation portion,
said rigidity-reduction portion of the powertrain-side mount bracket includes an opening portion which is formed at a position located above said connection portion and between said front-side leg portion and said rear-side leg portion,
in said rigidity-reduction portion of the powertrain-side mount bracket, said middle fixation portion is positioned inward, toward an interior of the vehicle body in the vehicle width direction, relative to a fixation position of said front-side leg portion and said rear-side leg portion fixed to the powertrain,
said opening portion is located directly above the attaching hole of the middle fixation portion in a direction perpendicular to each of the vehicle width direction and the vehicle longitudinal direction,
said powertrain-side mount bracket includes a vertical wall portion, which is formed between said front-side leg portion and said rear-side leg portion, and said rigidity-reduction portion of the powertrain-side mount bracket includes a lightening hole portion which is formed inside said vertical wall portion, and
said powertrain-side mount bracket includes a rib which is provided at the vertical wall portion in an area where said lightening hole portion is formed such that the rib is bridged inside the lightening hole portion.

2. The powertrain mount structure of the vehicle of claim 1, wherein said rigidity-reduction portion of the powertrain-side mount bracket includes a thin vertical wall portion, which is formed at a position located above said connection portion and between said front-side leg portion and said rear-side leg portion, the thin vertical wall portion having a narrower width than the front-side leg portion and the rear-side leg portion.

3. The powertrain mount structure of the vehicle of claim 1, wherein
the connection portion of said powertrain-side mount bracket is configured to linearly connect said front-side leg portion and said rear-side leg portion, and, in said rigidity-reduction portion of the powertrain-side mount bracket, said middle fixation portion is positioned inward, in the vehicle width direction, relative to the linear connection portion.

4. The powertrain mount structure of the vehicle of claim 1, wherein
said connection portion is formed by a front-side part which extends from said front-side leg portion toward said middle fixation portion and a rear-side part which extends from said rear-side leg portion toward said middle fixation portion, and, in said rigidity-reduction portion of the powertrain-side mount bracket, said middle fixation portion is positioned at a point where said front-side part of the connection portion and said rear-side part of the connection portion are continuous to each other.

* * * * *